United States Patent
Joisha

(10) Patent No.: US 8,103,706 B2
(45) Date of Patent: Jan. 24, 2012

(54) NONDEFERRED REFERENCE-COUNTING GARBAGE COLLECTION USING OVERLOOKING ROOTS

(75) Inventor: Pramod G. Joisha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 11/868,419

(22) Filed: Oct. 5, 2007

(65) Prior Publication Data

US 2009/0094300 A1    Apr. 9, 2009

(51) Int. Cl.
*G06F 17/30* (2006.01)
*G06F 17/00* (2006.01)

(52) U.S. Cl. ........................................ 707/814; 707/813

(58) Field of Classification Search ........... 707/999.206, 707/813, 814
See application file for complete search history.

(56) References Cited

U.S. PATENT DOCUMENTS

| | | | |
|---|---|---|---|
| 4,695,949 A | 9/1987 | Thatte et al. |
| 4,775,932 A | 10/1988 | Oxley et al. |
| 4,912,629 A | 3/1990 | Shuler, Jr. |
| 6,339,779 B1 | 1/2002 | Houldsworth |
| 6,363,403 B1 | 3/2002 | Roy et al. |
| 6,473,773 B1 | 10/2002 | Cheng et al. |
| 6,961,740 B2 | 11/2005 | O'Connor et al. |
| 6,993,770 B1 | 1/2006 | Detlefs et al. |
| 7,031,990 B2 | 4/2006 | Garthwaite |
| 7,216,136 B2 | 5/2007 | Bacon et al. |
| 2003/0140085 A1 | 7/2003 | Moir et al. |
| 2004/0111451 A1 | 6/2004 | Garthwaite |
| 2005/0015417 A1 | 1/2005 | Lewis |
| 2006/0143421 A1 | 6/2006 | Subramoney et al. |
| 2006/0167960 A1 | 7/2006 | Lomet |
| 2007/0022149 A1 | 1/2007 | Bacon et al. |
| 2007/0162527 A1 | 7/2007 | Wright et al. |
| 2007/0203960 A1 | 8/2007 | Guo |
| 2009/0094301 A1 | 4/2009 | Joisha |

OTHER PUBLICATIONS

Blackburn et al., "Ulterior Reference Counting: Fast Garbage Collection without a Long Wait," *OOPSLA* '03, Oct. 2003, pp. 344-358.
Joisha, "Compiler Optimizations for Nondeferred Reference-Counting Garbage Collection," *ISMM'06*, Jun. 2006, 12 pp.
Kumar et al., "Yama. A Scalable Generational Garbage Collector for Java in Multiprocessor Systems," *IEE Transactions on Parallel and Distributed Systems*, vol. 17, No. 2, Feb. 2006, pp. 148-159.
Levanoni et al., "An On-the-Fly Reference-Counting Garbage Collector for Java," *ACM Transactions on Programming Languages and Systems*, vol. 28, No. 1, Jan. 2006, pp. 1-69.
Plakal et al., "Concurrent Garbage Collection Using Program Slices on Multithreaded Processors," *The International Symposium on Memory Management*, Oct. 2000, 7 pp.
Vikram et al., "Code optimization: Memory management in .NET, part 1," http://builder.com.com/5100-6389-5109829.html, Dec. 5, 2003, 4 pp.

*Primary Examiner* — Tony Mahmoudi
*Assistant Examiner* — Brittany N McCue
(74) *Attorney, Agent, or Firm* — Klarquist Sparkman, LLP

(57) ABSTRACT

A reference-counting garbage collection system utilizing overlooking roots injects eager reference-counting updates into the program. An overlooking roots reference-counting subsumption optimization tool identifies redundant reference-counting updates and removes them, lowering the number of reference-counting update calls and improving execution throughput. The optimization tool also includes new overlooking root relationships in order to permit other unnecessary reference-counting updates to be removed during optimization. Reference-counting updates which are specialized based on the overlooking root information are also included in the program.

16 Claims, 23 Drawing Sheets

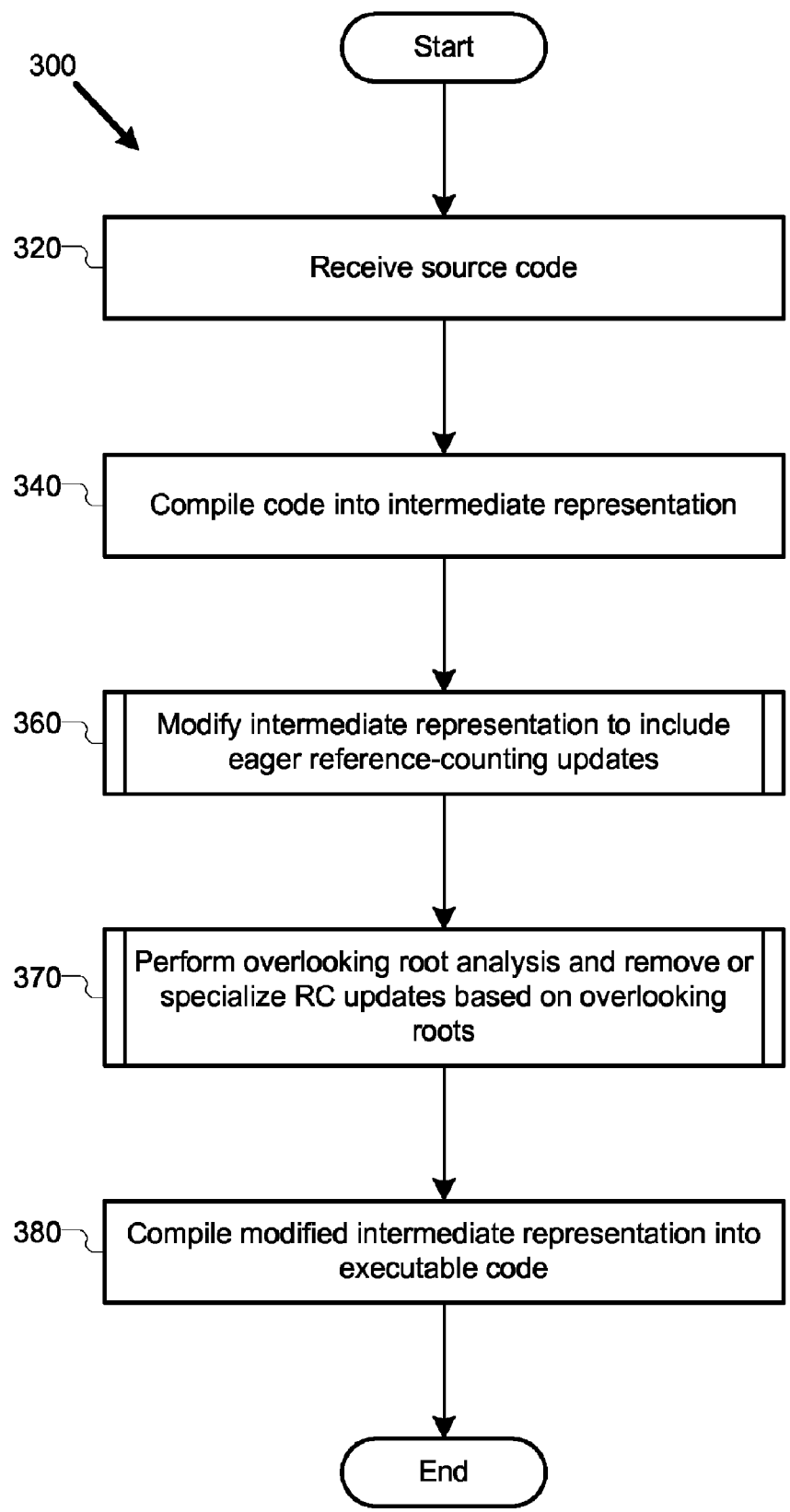

1   $x := \ldots$
2   $\triangleright RC_+(x)$

3   $y := x$
4   $\triangleright RC_+(y)$

5   $\ldots := \ldots y \ldots$
6   $\triangleright RC_-(y)$

7   $\ldots := \ldots x \ldots$
8   $\triangleright RC_-(x)$

RC Chaining Example

Software 2380 Implementing Eager RC
Insertion and Overlooking-Root-Based
Optimization Techniques

NONDEFERRED REFERENCE-COUNTING GARBAGE COLLECTION USING OVERLOOKING ROOTS

BACKGROUND

The vast majority of computer systems allow programs to dynamically allocate memory to data structures during execution. While dynamic allocation provides flexibility to programmers, systems which allocate memory must also find a way to identify and deallocate memory locations that are no longer being used during execution. Such techniques, which are generally known as garbage collection, allow for efficient use of memory, and prevent programs from running out of resources.

The efficiency of garbage collection schemes is often measured by reference to "throughput" and "pause time" metrics. Generally, "throughput" refers to the performance of a garbage collection technique. Specifically, the throughput of a program can be measured by the inverse of its execution time while using a particular garbage collection scheme. By another method of measurement, throughput is related to the amount of memory that can be reclaimed per amount of time that a program is executing. In the description to follow, we shall use throughput to mean the former description. Pause time, by contrast, is the amount of time taken up as the main program is prevented from executing while a garbage collector locates and reclaims memory.

Garbage collection methods are typically distinguished by the methods through which they identify memory locations that can no longer be reached during execution and how these methods affect throughput and pause time. For example, one collection technique called indirect collection periodically pauses execution of a main program in order to traverse memory references and identify memory locations that are no longer reachable by the program. While indirect-collection techniques usually show a relatively high throughput, as they combine reclamation of many memory locations into a single traversal, they tend to have high, and oftentimes unbounded, pause times.

By contrast, another technique, known as reference-counting ("RC") garbage collection, reclaims memory using a count maintained against each logically independent unit of data, for example, a count $\rho(x)$ is maintained against a unit of data x. In this example, $\rho(x)$ is a tally that signifies whether there are any references to x, and changes as references to x are added and deleted. These count increments and decrements are referred to herein generally as "RC updates." A $\rho(x)$ value of zero means that there are no references to x, at which point it is safe to reclaim x. RC techniques, generally, are superior to indirect-collection techniques in the pause time metric, because garbage collection calls are usually of bounded time. However, these techniques, through their frequent calling of garbage collection routines, can cause throughput to suffer.

Moreover, traditional RC implementations are typically based on a reachability view of memory management. That is, RC updates are applied just when references are actually destroyed (either due to a redefinition or due to a reference going out of scope) or created, or after that. This could cause garbage objects to be held long after the references to them are last used, resulting in a program consuming more memory than needed.

Thus there remains room for improving the execution time and peak memory usage characteristic of the RC garbage collection technique.

SUMMARY

A systematic compiler-oriented methodology for inserting and optimizing RC increments and decrements (collectively referred to as RC updates) is described. The methodology takes into account stack reference lifetimes determined through static program analysis to update the stack contribution to reference counts more eagerly than in the traditional, nondeferred, reachability-based style of RC collection (herein referred to as "classic" RC collection). The methodology has been couched in general terms to cover modern object-oriented instruction sets and features such as exceptions, interior pointers and object pinning.

An optimization called "overlooking reference-counting subsumption" or "ORCS," is also described that statically identifies and eliminates redundant RC updates on stack references based on an overlooking roots analysis. This optimization can significantly reduce the number of garbage collection calls and improve the throughput of the above described eager RC collection method, as well as that of classic RC collection. In addition, further optimizations are described which include new overlooking root relationships in order to enable unnecessary reference-counting updates to be removed during optimization. Among these are optimizations which remove updates to RC chained roots and immortal roots. Optimizations are also described for specializing reference-counting updates based on the overlooking root information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIG. 3 is a flowchart illustrating an example process for modifying a program to support eager reference-counting garbage collection.

DETAILED DESCRIPTION

Figure 1:
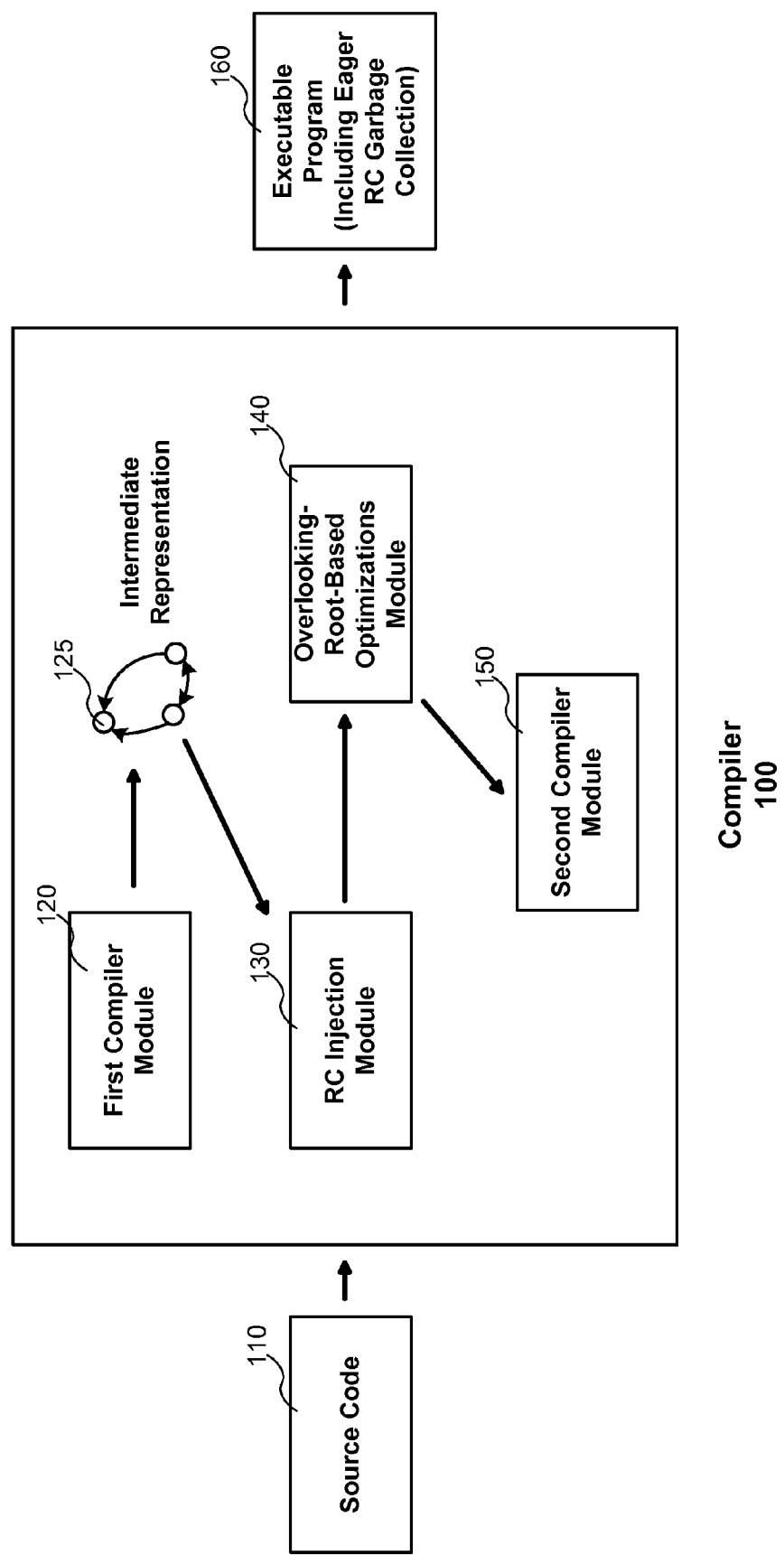
FIG. 1 is a block diagram of a compiler incorporating eager reference counting and reference-counting subsumption techniques.

Some existing RC garbage collection techniques ensure an always up-to-date value for $\rho(x)$. That is, using these techniques, an object's reference count is increased or decreased immediately before a reference to it is created or destroyed. Another class of RC techniques maintains $\rho(x)$ lazily and thus does not necessarily update RC counts immediately upon a reference being created or destroyed. Sometimes these lazy techniques are used to lower the number of calls that are made to RC functions, which improves the throughput. The tradeoff, however, is that these lazy techniques potentially allow unused memory to sit for an unacceptably long period of time without being reclaimed.

These techniques are contrasted by what can be called "eager" RC techniques. These techniques are a kind of non-deferred RC garbage collection, which can update $\rho(x)$ ahead of references actually materializing and disappearing. For example, if a reference l to an object x is no longer used, then $\rho(x)$ can be decremented ahead of l being overwritten or going out of scope. Such a technique, if efficiently implemented, could provide more immediate reclamation of memory than existing RC techniques while preserving reference counting's generally well-regarded pause times. Additionally, if an efficient number of redundant RC updates could be identified and eliminated before execution, the number of garbage collection calls made during execution could be reduced, improving throughput of RC techniques generally.

In the past, work was done relating to modifying a program to support eager RC garbage collection and to support limited elimination of redundant RC updates. These techniques, examples of which are described herein, can process a compiler's internal representation ("IR") of a program to produce a normal form of the program and then perform a liveness analysis on the program to determine reference lifetimes and thus points at which RC updates may be performed eagerly. Then RC updates are injected into the IR to support garbage collection based on the reference lifetimes. Through this analysis and injection at the proper points, the eager RC techniques described herein provide quicker reclamation of memory than other RC techniques, while still providing the bounded pause times which are a hallmark of RC garbage collection. These techniques and systems can be integrated into a compiler, providing garbage collection support during compilation.

Additionally, subsumption techniques utilizing overlooking roots are described which utilize a static program analysis to determine references that are subsumed by other references, and whose RC updates are thus redundant. Previous techniques generated an RC subsumption graph which identified subsumed references. RC updates on these references are then eliminated, reducing the number of RC calls in the program, and thus improving throughput.

These techniques prove needlessly restrictive however, and miss certain types of redundant updates. Techniques described herein improve the detection of subsumed references by utilizing a broader definition of potentially-removable updates using a concept of overlooking roots. Informally, a root x is said to "overlook" a root y if whatever is reachable from y is also reachable from x. In one implementation, the term "root" should be taken as a local or static reference. Subsumption processes based on overlooking roots, also known as "overlooking reference-counting subsumption" or "ORCS," as described herein, are more liberal in their identification of removable RC updates and thus improve performance by excising additional redundancy.

1. Examples of Supported Language Features

The techniques and systems described herein will generally be described with reference to the IR of an input program. This is done because the techniques described herein are generally not language-specific, and also because the techniques can be readily integrated into compilation procedures by being based on the manipulation of a compiler IR.

In various implementations, RC updates could be inserted into a compiler's intermediate representation at various points in a pipeline of phases: either when the IR is at a high level, medium level or after it has been lowered into whichever native code the compiler is configured to produce. Inserting RC updates into the high-level IR permits optimization opportunities that may not be identifiable in other IRs. Implementations which utilize modifications of high-level IRs must also ensure that the downstream phases be aware of RC updates and preserve the invariants that their insertion imposes. In alternative implementations, the analysis and insertion of RC updates could be performed on source programming language code rather than an intermediate representation.

At the IR level, the techniques described herein assume that there are two kinds of pointers relevant to garbage collection: references, which resemble the object references of Java and C#, and interior pointers ("IPs"), which resemble the managed pointers of .NET. Typically, interior pointers are similar to conventional pointers in that they are dereferenceable. However, they are associated with strong typing information and have only a limited set of operations.

As far as logical units of data are concerned in the description herein, there are two kinds: objects that reside on the heap (including arrays), and value types (like struct types) that reside on the stack. While references point to the beginning of objects, interior pointers can point to an object's beginning as well as specific places in the middle, such as, for example, fields and array elements. IPs can also point into the static data area and the stack, in which case they must target the beginning of a value type, a field thereof, or a reference. In one implementation, the syntax S of their definitions is determined by the following exemplary grammar productions:

S::=T:=A

A::=&L|&R[I]|unbox(R)|&(W.F)|T±I

In these grammar productions, L is the set of local value-type and reference variables, R is the set of local reference variables, T is the set of interior pointers (which are local variables), W is the set of local reference and interior pointer variables (i.e., W=R∪T), I is the set of integer-valued expressions, and F is the set of static, object and value-type fields. unbox is an operator that takes a reference to an object-version of a value type (sometimes called a boxed value type) and returns an interior pointer to its beginning. The "member access" operator ('.') extracts a field of an object or a value-type instance, given a reference or an interior pointer to it. The "address of" operator ('&') returns the address of a variable, field or array element. Thus, &(L.F) is an interior pointer to a field of a heap object or a field of a value-type stack instance, and &.F is an interior pointer to a static field.

In implementations supporting the grammar productions listed above, interior pointers cannot be stored into the heap, a field of a value type, or returned from a function. However, both references and interior pointers are allowed to be passed into functions. These restrictions are similar to those in the .NET standard of Microsoft Corporation. While the productions above do not cover all possible ways of defining interior pointers in .NET—for example, conversions from so-called unmanaged pointers to interior pointers, alternative eager RC and subsumption implementations can be modified in a straightforward manner to deal with these additional cases. Additionally, in an alternative implementation, the techniques described herein can be extended to support a language that allows IPs to be returned from a function.

Some of the descriptions herein also assume a service called findstart(p) provided by a garbage collection allocator that returns a reference to the start of the object enveloping the interior pointer p if p points into the heap, and null otherwise.

The techniques described herein support that any variable v that is either an interior pointer or a reference can carry an attribute, called pinned, that prevents the garbage collector from reclaiming (or moving) any object that v may point to until v's redefinition, or until the end of v's lexical scope.

In various language implementations, value types can contain references. These need to be properly accounted for in compiler-assisted RC collection schemes. Rather than specifically considering them and for the sake of uncluttered explanation, the techniques can assume the execution of a value-type "unwrapping" phase prior to the RC update insertion phase that replaces all field-possessing value-type variables by a series of variables corresponding to the primitive value-type fields and reference fields directly or indirectly embedded in them. This unwrapping can adjust the signatures of functions that accept or return reference-embedding value types.

Finally, the techniques support languages where statements in the IR can throw exceptions. Excluding function call instructions, it is assumed herein that when a statement throws an exception, it does so without discharging any of the external state side-effect actions that it would normally perform in the course of program execution, with the external state being the heap, stack and static data. The action of throwing an exception could be implicit, such as when the divisor in a division instruction is zero. For explicitly throwing exceptions, it can be assumed that the IR provides a throw statement, which is allowed to occur only at the end of basic blocks.

2. Examples of Eager Reference Counting and Subsumption Architectures

FIG. 1 is a block diagram illustrating components of a compiler which incorporates the eager RC garbage collection and RC subsumption optimization techniques and systems described herein. In another implementation, components of FIG. 1, as well as their functions, may be found in a translator rather than a compiler. Note that while the example implementation illustrates particular software modules for the sake of illustration, in alternative implementations, one or more of the illustrated modules may be merged, divided into additional modules, or omitted altogether.

FIG. 1 illustrates a sample compiler 100 which accepts programming language source code 110 as input and outputs an executable program 160 which implements eager RC garbage collection. Examples of source code include, but are not limited to, programming language code such as C++, Java, C# and .NET. In alternative implementations, the source code 110 may include code which operates at a higher or lower level than traditional programming language code, such as, for example, script code or assembly code. The compiler 100 creates optimized eager RC-instrumented executable programs by integrating an RC injection module 130 and an overlooking overlooking-root-based optimizations module 140.

It should be noted that, as used in this application, the terms "optimize," "optimized," "optimization" and the like are terms of art that generally refer to improvement without reference to any particular degree of improvement. Thus, in various scenarios, while an "optimization" may improve one or more aspects of the performance of a system or technique, it does not necessarily require that every aspect of the system or technique be improved. Additionally, in various situations, "optimization" does not necessarily imply improvement of any aspect to any particular minimum or maximum degree. Finally, while an "optimized" system or technique may show performance improvement in one or more areas, it may likewise show a decrease in performance in other areas. In the particular circumstances described below, while optimizations will result in the removal of redundant or superfluous RC updates, possibly providing increased performance, these optimizations should not imply that every possible RC update will be identified or removed.

As FIG. 1 illustrates, in a preferred implementation, the input programming language source code 110 is partially compiled by a first compiler module 120 into an intermediate representation 125. In the illustrated implementation, the IR 125 is a control-flow graph ("CFG"), while in other implementations, as mentioned above, the IR maybe higher or lower in the compilation process.

In a typical CFG implementation, nodes in the CFG are basic blocks and arcs depict the control flow between them. CFG edges are of two types: normal arcs that denote the normal flow of control from the end of one basic block to the beginning of another, and exception arcs that represent the flow of control from anywhere within a basic block to the header block of an exception handler. In one implementation, exception header blocks contain a special statement called an exception assignment that catches and assigns the thrown exception to an exception variable. This statement is assumed to have the form x:=catch( ), where catch is an IR opcode, and is classified as a function call instruction for the purposes of this description.

After creation of an IR 125, the IR 125 is passed to an RC injection module 130 that serves to add instrumentation for eager RC garbage collection, and then to an overlooking-root-based optimizations module 140 where RC updates on RC-subsumed references are identified utilizing an overlooking roots analysis and then removed. Moreover, in some implementations, additional optimizations based on the overlooking roots information are performed by this module. Particular implementations of these processes will be described in greater detail below. Finally, the IR with RC instrumentation added to it is passed to a second compiler module 150 for compilation into the executable program 160.

Figure 2A:
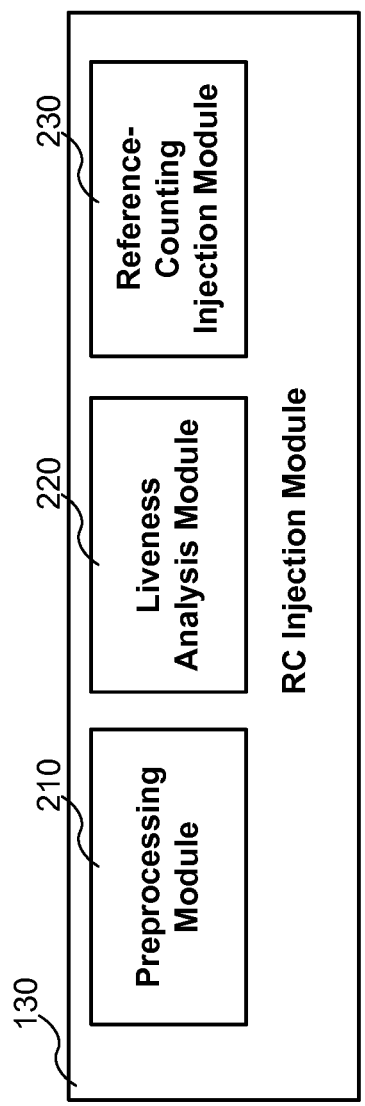
FIGS. 2a and 2b are block diagrams of reference-counting injection and overlooking-root-based optimizations modules.
Figure 2B:
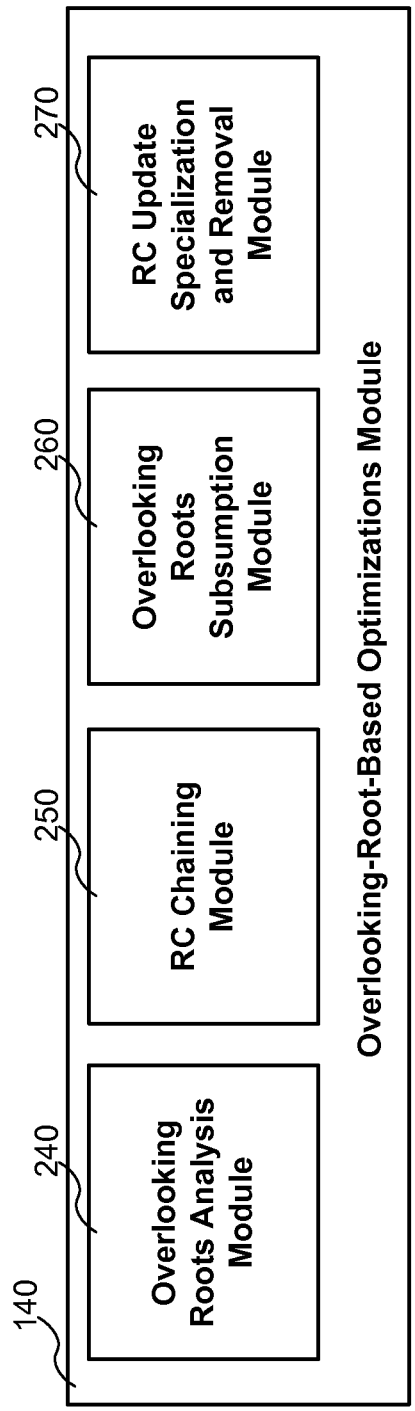

FIGS. 2a and 2b are block diagrams illustrating example implementations of the RC injection module 130 and the overlooking-root-based optimizations module 140. While the illustrated implementations divide functions of the RC injection module 130 and the overlooking-root-based optimizations module 140 into particular illustrated modules, in alternative implementations, the illustrated modules can be combined, divided further, or omitted.

The illustrated RC injection module 130 of FIG. 2a comprises three modules which perform the tasks of preparing, analyzing, and modifying an IR of a program to support eager RC garbage collection. The first illustrated module is the preprocessing module 210, which converts an IR into a normal form for further processing. The second illustrated module is a liveness analysis module 220 which analyzes the IR to determine when references are live within the program; these live references can then be used to determine points at which eager RC updates are to be inserted. This insertion is performed by the third illustrated module, the RC injection module 230, which, based on the liveness information determined by the liveness analysis module 220, injects the IR with RC updates to provide for eager RC garbage collection. Particular implementations of the processes performed by these modules will be described in greater detail below.

The illustrated overlooking-root-based optimizations module 140 of FIG. 2b comprises four modules which perform the tasks of analyzing a program and removing redundant RC updates. Modules 240, 250, 260, and 270 work together to identify and remove needless RC updates from the program, or specialize the existing RC updates. The first of the illustrated modules is the overlooking roots analysis module 240, which facilitates optimizations performed by other modules of module 140 by performing an analysis on the program to identify overlooking roots at various program points. As part of this analysis, the module 240 may identify particular state information about roots by introducing particular virtual overlooking roots; later optimizations may then rely on these manufactured overlooking relationships to indicate that particular specializations or removals of RC updates may be performed. In one implementation, the overlooking roots analysis is implemented as a client service, such that modules implementing the various optimizations may utilize it during their execution.

The second module illustrated in FIG. 2b is the RC chaining module 250. This module identifies roots which satisfy particular RC chaining conditions, as described below, and for which certain RC updates are unnecessary. The module then injects roots into the program which cause these updates to be removed during later subsumption analysis. In one implementation, the RC chaining module 250 utilizes the overlooking roots analysis module 240 for overlooking roots information which it then utilizes to perform the RC chaining transformation.

The third illustrated module is the overlooking roots subsumption module 260, which again utilizes overlooking root information developed by the module 240 to identify and determine RC updates which can be culled and to remove these redundant RC updates.

The final illustrated module is the RC update specialization and removal module 270. This module utilizes overlooking roots information gained from the overlooking roots analysis module 240 to substitute specialized versions of RC updates for traditional ones. In various implementations, the overlooking roots relation can be used to encode state or other information, which can eliminate the need for certain checks performed during RC updates. Thus, simplified versions can be substituted which do not implement these checks, improving the efficiency of those particular updates. Additionally, the module 270 also removes extraneous updates which are known to be extraneous due to particular overlooking root information, but which were not removed by the processes of the overlooking roots subsumption module 260. Particular examples of processes for performing the functions of the modules described above are discussed in detail below.

3. Examples of Eager RC Transformation Processes

FIG. 3 is a flowchart illustrating an example process 300 performed by the compiler 100 for performing the RC injection and overlooking-root-based optimization processes. In various implementations, the illustrated process blocks may be merged, divided into subblocks, or omitted. The process starts at block 320, where source code is received by the compiler. Next, at block 340, the code is compiled by the compiler 100 into an intermediate representation. The process then continues to block 360 where the IR is modified to include eager RC updates. The examples of this process are described in greater detail below with respect to FIG. 4. Next, process 300 continues to block 370, where an overlooking roots analysis is performed by the compiler 100 to remove unnecessary RC updates, or specialize existing RC updates based on the overlooking roots information. Finally, at block 380, the compiler 100 compiles the modified IR into executable code and the process ends.

Figure 4:
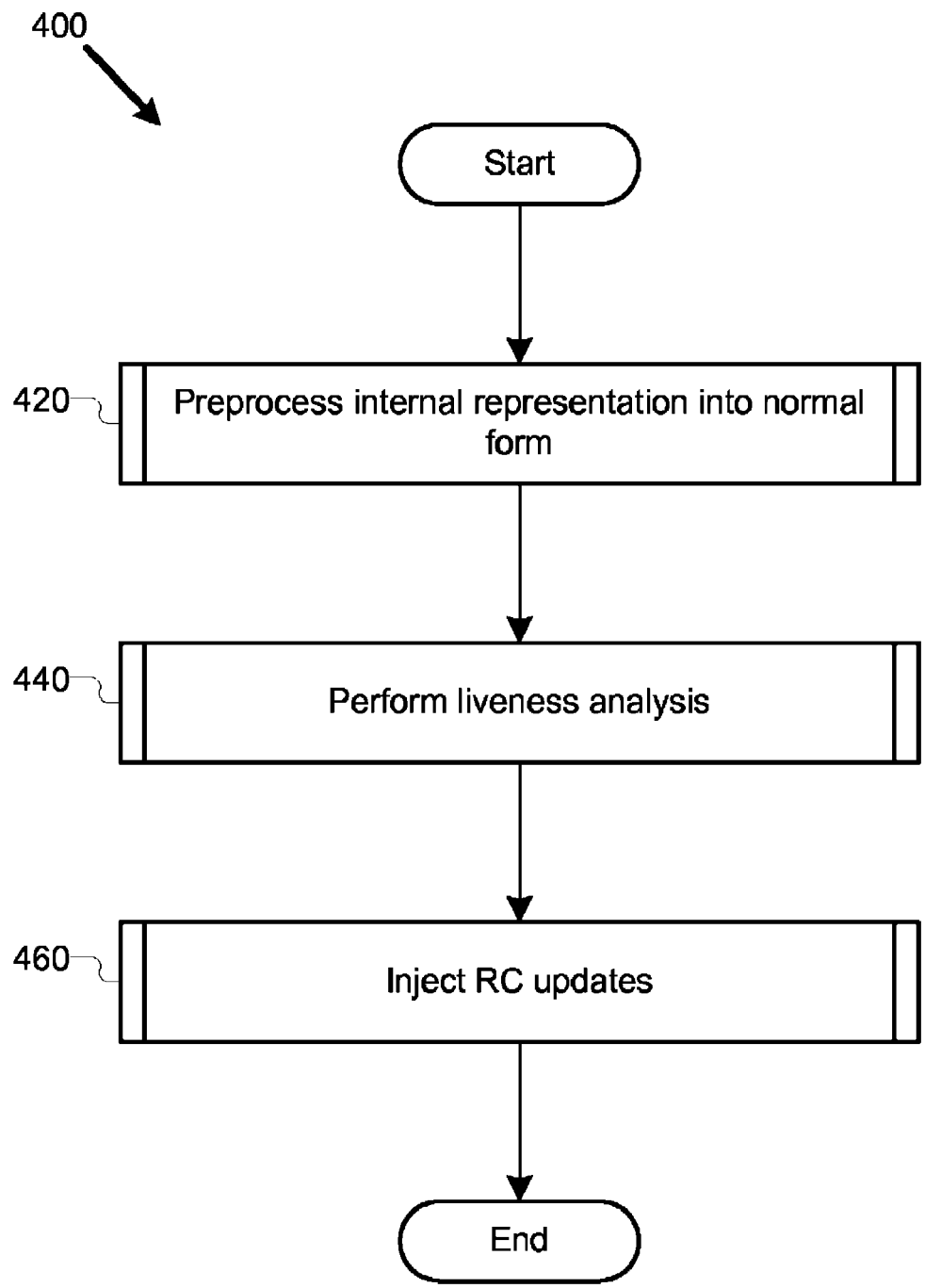
FIG. 4 is a flowchart illustrating an example process for modifying an internal compiler representation of a program to support eager reference-counting garbage collection.

Generally, the processes described herein for inserting eager RC garbage collection instrumentation comprise three stages. FIG. 4 illustrates an example three-stage process 400 performed by the RC injection module 130 for inserting RC garbage collection instrumentation. In one implementation, process 400 corresponds to block 360 of FIG. 3. In various implementations, the illustrated process blocks may be merged, divided into subblocks, or omitted. While the techniques described herein describe particular methods of inserting RC updates, alternative implementations may take advantage of different updating schemes.

The process begins at block 420, where the preprocessing module 210 preprocesses the IR, produced by the compiler 100, into a normal form. This normal form provides that references returned from functions are not lost; if these references were not captured, memory leaks could arise. The normal form also provides that the actual-to-formal copying of reference parameters at call sites is automatically handled at later stages and that the definitions and deaths of interior pointers can be ignored by the later stages.

Next, at block 440, the liveness analysis module 220 performs a live-range analysis on local references, modified to model the object lifetime semantics of pinned references. In one implementation, this second stage can be implemented using known live-range analysis techniques which are modified to handle the semantics of pinned references. Next, the RC injection module 230 introduces RC updates against local and heap references, their placement being guided by the liveness information previously derived in the second stage.

3.1 Preprocessing Examples

Figure 5:
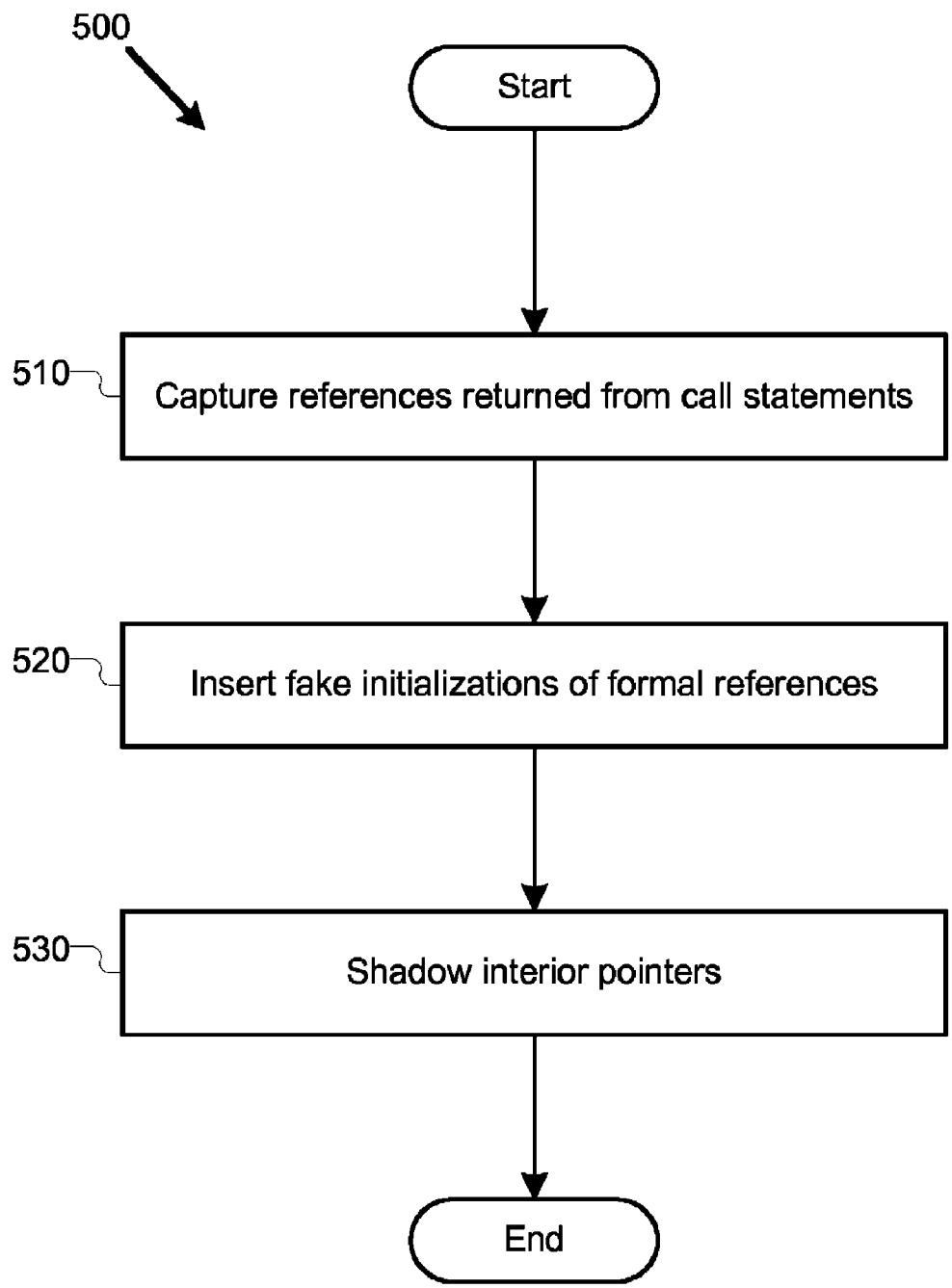
FIG. 5 is a flowchart illustrating an example process for preprocessing an internal compiler representation of a program into a normal form.

FIG. 5 illustrates an example process 500 performed by the preprocessing module 210 for preprocessing an IR into a normal form. In one implementation, process 500 corresponds to block 420 of FIG. 4. In various implementations, the illustrated process blocks may be merged, divided into subblocks, or omitted. The process begins at block 510, where references returned from call statements are captured. In one implementation, this is performed by replacing IR statements of the form $f(x, y, \ldots)$, where $f$ is a function that returns a reference, with an IR statement $\dot{r} := f(x, y, \ldots)$, where $\dot{r}$ is a compiler-generated temporary.

Next, at block 520, the preprocessing module 210 introduces fake initializations of formal references. This is performed, in one implementation, by inserting initializations of the form z:=fakedef( )

at the top of the CFG's entry basic block, for every formal reference parameter z. In one implementation, these fakedef statements are eventually lowered into no-ops, and are included only to simulate the call-by-value semantics of the parameter-passing mechanism. Preferably, they are regarded as non-call instructions in the third stage of process 400, and exist to cause the injection of RC increments against formal references immediately on entry to a function. In an alternative implementation, these semantics could be simulated by the trivial assignment z:=z; however, because of various features of some implementations of the eager RC injection process, described below, this trivial assignment solution is not preferred. Another alternative implementation could inject RC increments against the actual references on the caller side. While this may provide advantages such as a more eager reclamation discipline (by avoiding unnecessarily retaining garbage across function calls), this could also result in more code.

Next, at process 530, the preprocessing module 210 pairs every IP with a compiler-generated reference called a shadow at various program points. In one implementation, this is done by preceding every definition of an IP with a definition that assigns its shadow to the start of its enveloping object. In addition, a pinned attribute on an IP is carried over to its shadow. The shadowing procedure also comprises following each use of an IP by a fake use of its shadow. In this way, the later stages of the RC injection processes can ignore IPs while knowing that any memory management of objects pointed to by IPs is taken care of by management of the shadows.

Different kinds of IP definitions involve different methods of creating shadows. For instance, if $\tilde{p}$ is the shadow of an interior pointer p, then in one implementation, the preprocessing module 210 inserts an assignment against a definition of p that points it into an array in the heap as follows. (Please note that for the sake of illustration, in this and subsequent examples, IR statements which are inserted by the described techniques will be denoted with the symbol ▷.)

p:=&r[e] ⇒ ▷$\tilde{p}$:=r
p:=&r[e]

Note from the syntax description above that r is a local reference variable. If, by contrast, p were defined to point into the stack (for example, by assigning the address of r to it), then in one implementation, the following code would be produced:

p:=&r ⇒ ▷$\tilde{p}$:=null
p:=&r

Other kinds of definitions involving the address-of and unbox operators can be similarly dealt with. In another example implementation, to handle definitions involving an offset calculation on an interior pointer, the compiler inserts basic blocks with the following code:

| | | |
|---|---|---|
| p := q ± e | ⇒ | ▷w := (q ± e) − $\tilde{q}$ |
| | | ▷if w ≧ 0 ∧ w < sz |
| | | $\tilde{p}$ := $\tilde{q}$ |
| | | else |
| | | $\tilde{p}$ := findstart(q ± e) |
| | | end |
| | | p := q ± e |

In this insertion example, $\tilde{p}$ and $\tilde{q}$ are the shadows of the interior pointers p and q, e is an integer-valued expression and sz is the statically determined size of the object pointed to by $\tilde{q}$.

As mentioned above, the process of shadowing interior pointers also includes introducing a fake use of a shadow after each use of an interior pointer in the IR:

. . . := . . . p . . . ⇒ . . . := . . . p . . .
▷fakeuse($\tilde{p}$)

Similarly to the fakedef operator, the fakeuse operator is lowered into a no-op during compilation; it is introduced here to ensure that in the live-range analysis of the second stage of process 400, the lifetime of every interior pointer is subsumed by that of its shadow.

It should also be noted that shadow references need not be passed into functions that take in IP parameters because every IP formal parameter is guaranteed after preprocessing to have an associated shadow reference up the call stack whose lifetime subsumes the call. This subsumption makes RC updates on the IP parameter redundant, and thus not necessary. In another implementation, shadow references could be passed into functions, realizing a nondeferred RC scheme that is more aggressive in reclaiming storage.

3.2 Examples of Live-Range Analysis

Figure 6:
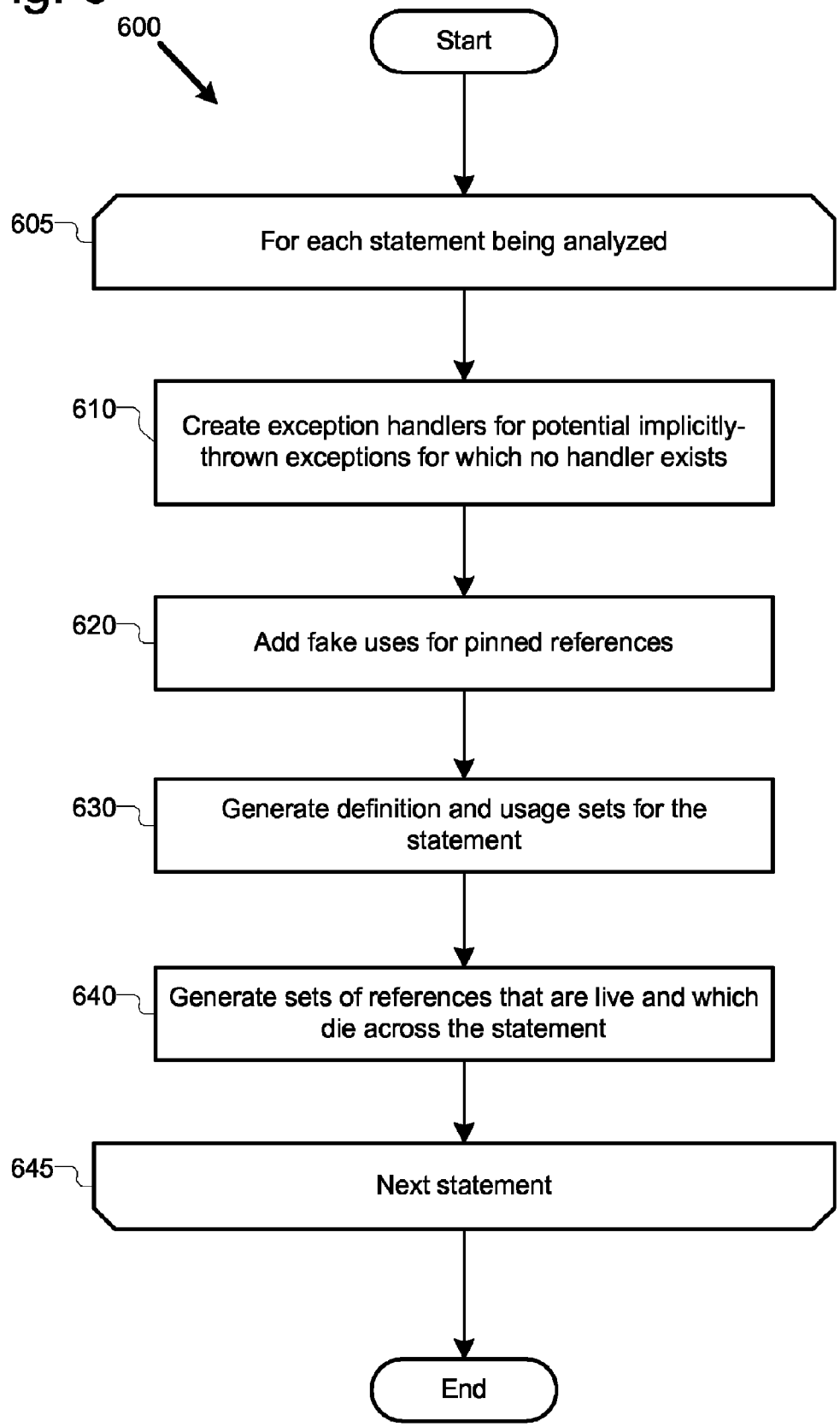
FIG. 6 is a flowchart illustrating an example process for performing a liveness analysis on an internal compiler representation of a program.

The live-range analysis is the second stage of the eager RC instrumentation process. FIG. 6 illustrates an example process 600 performed by the liveness analysis module 220 for determining when references will be live during execution. In one implementation, process 600 corresponds to block 440 of FIG. 4. In various implementations, the illustrated process blocks may be merged, divided into subblocks, or omitted. The process begins at block 605, where it enters a loop that operates over every statement in the IR. In alternative implementations, the loop may be limited to a particular section or function of the program.

At block 610, a default exception handler is created against the currently analyzed statement for every exception that it could implicitly throw and for which a handler does not already exist. The default handler simply catches and re-throws the exception via the throw statement.

Next at block 620, fake uses for pinned references are added. This is done because an RC decrement cannot be inserted after the last use of a pinned reference r since the object that it targets must be held until its redefinition or until the end of its lexical scope. Furthermore, simply considering r as live throughout a function is not sufficient because an RC decrement is needed just before each of r's redefinitions. Instead, the live ranges of r need to be stretched so that they span the definition points of r and so that they extend until the end of the body of the function that r is found in. This can be done by (a) introducing a fake use of r into each statement that must define r, and by (b) introducing fakeuse(r) as the last statement in basic blocks that return control from the function. After this extension and the ensuing liveness calculations, the insertion process performed by the RC injection module 230 automatically achieves the pinned semantics for r.

At block 630, definition and usage sets are generated for the current statement. In one implementation, for a statement s of a basic block, the sets $\text{defs}_{must}(s)$ and $\text{uses}_{may}(s)$ are defined as the sets of local references that must be defined at s and which may be used at s respectively.

Finally, at block 640, the sets of references that are live at a statement, and that die across it, are generated. In one implementation, this is performed based on the following equation, which relates the local references that are live before and after the statement s:

$$\text{live}_{in}(s) = (\text{live}_{out}(s) - \text{defs}_{must}(s)) \cup \text{uses}_{may}(s).$$

This equation is applied on the function's statements in reverse order, starting from its exit basic block and proceeding to its entry basic block. For the exit basic block, two kinds of references are considered live at its end: (1) those returned from the function, and (2) those expressly thrown (using the throw statement) from basic blocks lacking handlers for the exception.

From the above sets, the set of local references that die across a statement s is $$\text{dieacross}(s) = (\text{live}_{in}(s) \cup \text{defs}_{must}(s)) - \text{live}_{out}(s).$$

Hence dieacross(s) is exactly the set of references against which RC decrements are required just after s, assuming three conditions hold: (1) heap references are not defined in s; (2) local references are not both used and defined in s; and (3) the set of local references that may be defined in s (for example, through interior pointers) is the same as $\text{defs}_{must}(s)$. However, the injection process described below is resilient to any of these conditions not holding.

After block 640, the process continues on to block 645, where it is repeated for the next statement.

3.3 Examples of RC Injection

Figure 7:
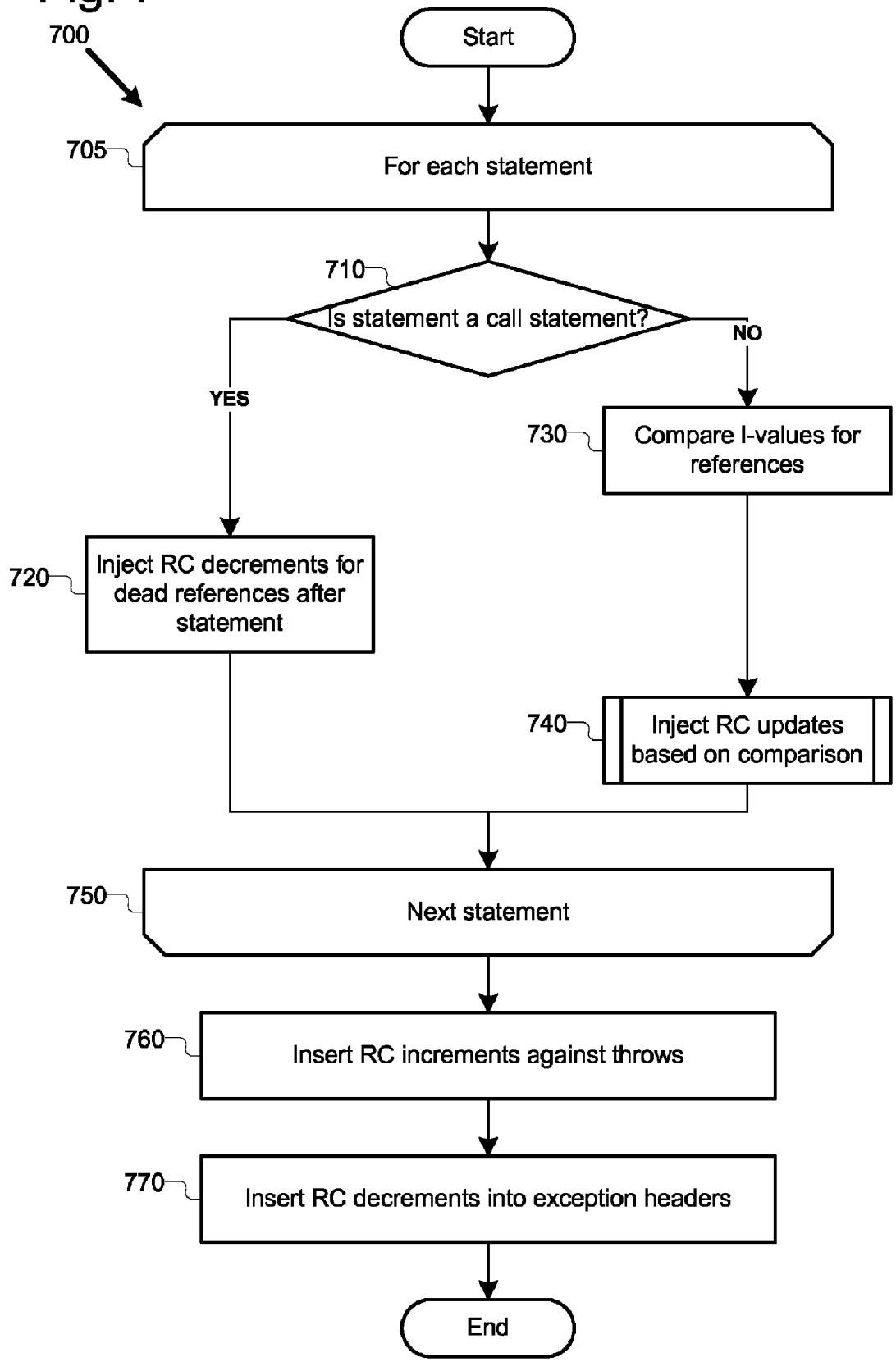
FIG. 7 is a flowchart illustrating an example process for injecting eager reference-counting updates into an internal compiler representation of a program.

The RC injection stage is the third stage of the eager RC instrumentation process 400. FIG. 7 illustrates an example process 700 performed by the RC injection module 230 for adding RC updates to the IR. In one implementation, process 700 corresponds to block 460 of FIG. 4. In various implementations, the illustrated process blocks may be merged, divided into subblocks, or omitted.

Generally, RC updates are inserted by this stage over three steps using liveness information. The first step injects RC increments and decrements against heap and local references immediately after statements. It should be noted that only statements that exist before this stage are considered in this step. The second step injects RC increments against references thrown using throw and for which there is an exception handler in the function. The injection happens just before the throw statement. The third step introduces RC decrements on references which die in a basic block into that basic block's exception header, if it has one.

Thus, the process begins at block 705, where the process enters a loop that repeats for each statement in the IR. Inside the loop, the process continues to decision block 710, where the RC injection module determines if the current statement is a call statement. As noted above in one implementation, exception assignments and the fakedef statement are considered call and non-call instructions respectively for the purposes of process 700. Also, in one implementation, allocation instructions of the form r:=newobj( )

where r is a reference to a new object, are considered call statements for the purposes of injection. (Note that under this implementation, an RC increment is not inserted after the allocation statement because objects have a reference count of 1 when first allocated.)

If, at decision block 710, the module determines that the statement is a call statement, the process continues to block 720, where RC decrements are injected after the call statement for all references that die across the statement. Apart from the RC decrements against them, no other RC updates or assignments are injected. In particular, no RC increments are present before the call against the actual reference parameters because the necessary increments occur on entry into the function. IP arguments as well need no special consideration because they are indirectly taken care of through their shadows, as discussed above with respect to FIG. 5. And no RC increment is applied on the returned reference because an increment would have already occurred in the called function when the return parameter is defined. As mentioned above, returned references are considered live on exit from a function. Therefore, they will not be subjected to an RC decrement in the function after their last definition.

Thus for $d_i \in \text{dieacross}(s)$, a function call $r := f(x, y, \ldots)$ becomes the set of instructions:

$$r := f(x, y, \ldots)$$
$$\triangleright RC_-(d_1)$$
$$\triangleright RC_-(d_2)$$
$$\vdots$$
$$\triangleright RC_-(d_m).$$

Here, $RC_-(r)$ and $RC_+(r)$ represent RC increment and decrement instructions on the object targeted by the reference r. Also note that if r is null, then these operations become no-ops.

If instead, the RC injection module determines at decision block 710 that the statement is not a call statement, more complex RC injections are used. These injections are performed with reference to various sets of references for the current statement. The context of the sets is based on liveness information that can be derived from a static analysis of the IR. Thus, in one implementation, the sets are referred to as follows: Let ldefs(s) be the set of l-value expressions of all references (stack and heap) that may be defined at a statement s, and let L (Q) be the set of l-values for variables in the set Q. The remaining sets used during RC injection are:

$u_i \in \text{defs}_{must}(s) \cap \text{live}_{in}(s),$
$a_i \in \text{defs}_{must}(s),$
$d_i \in \text{dieacross}(s),$
$w_i \in \text{defs}_{must}(s) - \text{uses}_{may}(s),$
$p_i \in \text{ldefs}(s).$ In a preferred implementation, the behavior of the RC injection module 230 depends on whether the compiler can establish that L $(\text{defs}_{must}(s))$ equals ldefs(s). Thus, at block 730, these l-value sets are compared. Then, at block 740, RC updates are injected based upon the comparison.

Figure 8:
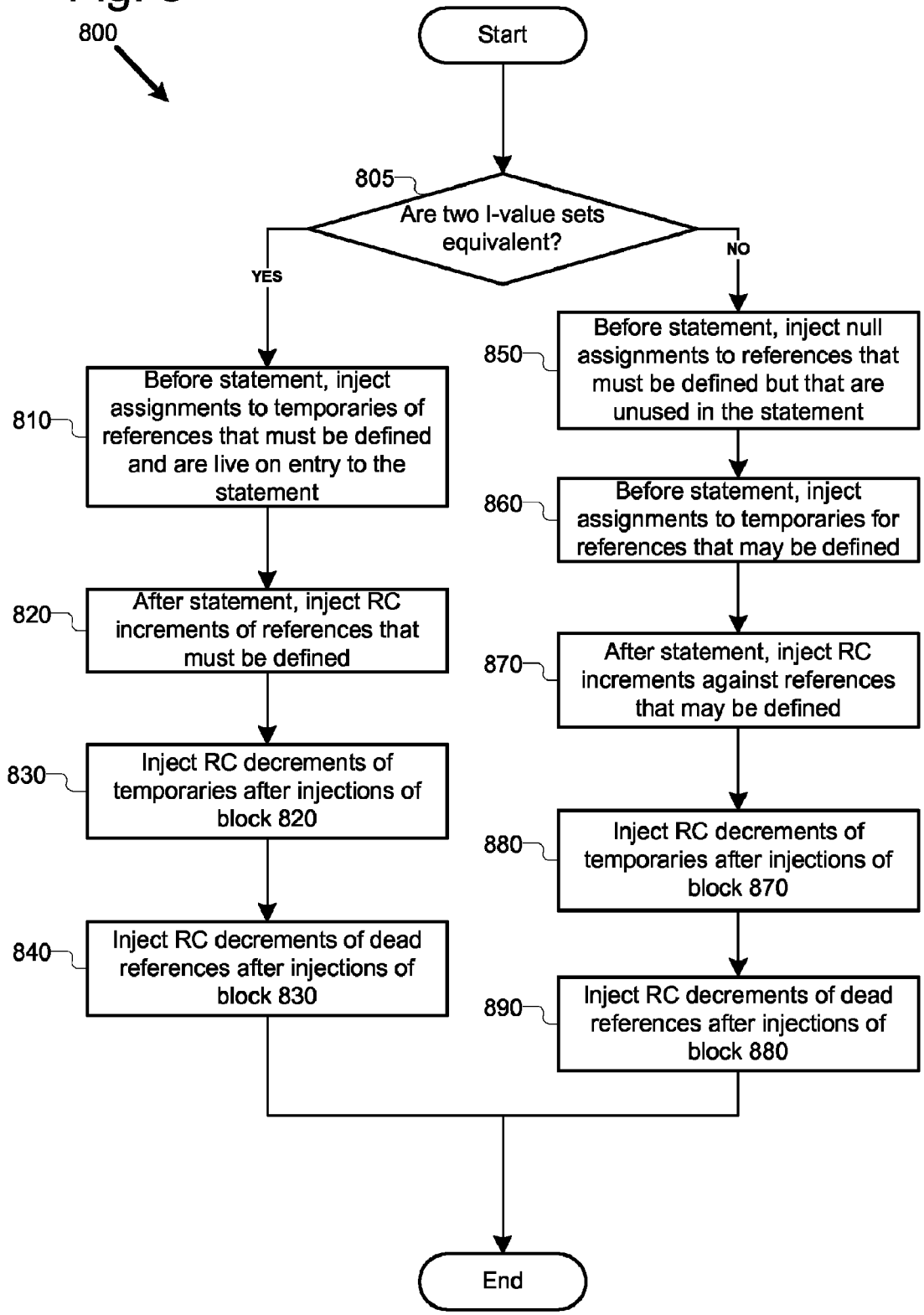
FIG. 8 is a flowchart illustrating a further example process for injecting eager reference-counting updates into an internal compiler representation of a program.

FIG. 8 illustrates an example process 800 performed by the RC injection module 230 for injecting RC updates after a non-call statement. In one implementation, process 800 corresponds to block 740 of FIG. 7. In various implementations, the illustrated process blocks may be merged, divided into subblocks, or omitted.

The process begins at decision block 805, where the RC injection module 230 determines if the sets L (defs$_{must}$(s)) and ldefs(s) are equivalent. If the two sets are found to be equivalent, references common to defs$_{must}$(s) and live$_{in}$(s) are saved so that their old values are available for doing RC decrements after s. Thus, at block 810, these assignments are injected. Next, at block 820, RC increments are injected for all references defined in s. This is followed by injecting decrements against the temporaries at block 830. Thus, the use of temporaries allows former targets of redefined references to be decremented. Finally, at block 840, RC decrements are inserted against local references that die across s and the process ends.

Note that in the case of the trivial assignment z:=z, the inserted RC updates would cancel out; in particular, the RC increment against z would be balanced by the following RC decrement against the temporary that holds the previous value of z. This is why, in one implementation, formal references are initialized using fakedef statements in the process of FIG. 5 above and not by using trivial assignments.

Thus, for a non-call statement s for which L(defs$_{must}$(s))= ldefs(s), the following RC injections occur (variables with dot accents represent the temporaries):

$$\triangleright \ddot{i}_1 := u_1$$
$$\triangleright \ddot{i}_2 := u_2$$
$$\vdots$$
$$\triangleright \ddot{i}_k := u_k$$
$$s$$
$$\triangleright RC_+(a_1)$$
$$\triangleright RC_+(a_2)$$
$$\vdots$$
$$\triangleright RC_+(a_l)$$
$$\triangleright RC_-(\ddot{i}_1)$$
$$\triangleright RC_-(\ddot{i}_2)$$
$$\vdots$$
$$\triangleright RC_-(\ddot{i}_k)$$
$$\triangleright RC_-(d_1)$$
$$\triangleright RC_-(d_2)$$
$$\vdots$$
$$\triangleright RC_-(d_m)$$

If, however, at decision block 805 the RC injection module 230 determines that L(defs$_{must}$(s))≠ldefs(s), a different set of injections occurs. First, at block 850, null assignments are injected against the w$_i$ references, which are those references that must be defined in s but which are not used in s. This is done because RC decrements already exist at an earlier place since these references die before their redefinition in s. They are thus assigned null to preclude double decrements later when decrements against temporaries are made.

Next, at block 860, the module injects assignments to temporaries for references which may be defined in s. In one implementation, these assignments to temporaries apply the dereference operator ("*") on l-value expressions in ldefs(s) to obtain the old values of references potentially to be overwritten in s. Next, at block 870, RC increments are made against the potentially new references. Then the process proceeds to block 880, where the temporaries are subjected to RC decrements. Finally, at block 890, RC decrements are injected against the references that die across s and the process ends.

Thus, for a non-call statement s for which L(defs$_{must}$(s))≠ ldefs(s), the following RC injections occur:

$$\triangleright w_1 := null$$
$$\triangleright w_2 := null$$
$$\vdots$$
$$\triangleright w_n := null$$
$$\triangleright \ddot{i}_1 := {}^*p_1$$
$$\triangleright \ddot{i}_2 := {}^*p_2$$
$$\vdots$$
$$\triangleright \ddot{i}_k := {}^*p_k$$
$$s$$
$$\triangleright RC_+({}^*p_1)$$
$$\triangleright RC_+({}^*p_2)$$
$$\vdots$$
$$\triangleright RC_+({}^*p_k)$$
$$\triangleright RC_-(\ddot{i}_1)$$
$$\triangleright RC_-(\ddot{i}_2)$$
$$\vdots$$
$$\triangleright RC_-(\ddot{i}_k)$$
$$\triangleright RC_-(d_1)$$
$$\triangleright RC_-(d_2)$$
$$\vdots$$
$$\triangleright RC_-(d_m)$$

In an alternative implementation, not every increment and decrement is necessary; if an alias analysis can prove that a p$_j$ will point to a w$_q$, then the statements w$_q$:=null, $\ddot{t}_j$:=*p and RC$_-(\ddot{t}_j)$ can be omitted.

Returning to the process of FIG. 7, after RC updates are injected, the process loops again at block 750 if there are additional statements. After all statements have had RC updates injected against them, the process continues to block 760, where RC increments are inserted against throw statements. In one implementation, exceptions that are explicitly thrown from basic blocks without exception handlers are treated the same way as returned references. That is, no RC decrement against the thrown reference is injected after its last definition because the reference is considered live on exit from the function. This is why in one implementation exception assignments are regarded as call instructions for the purposes of decision block 710 above, since this prevents the injection of an RC increment against the exception variable when the exception is caught up the call stack.

On the other hand, when explicitly thrown references are caught in the same function, the absence of an RC increment against the exception variable must be countered by an RC increment at the point of the throw statement, or earlier.

Finally, there is one last concern. If a statement s were to throw an exception, then none of the ensuing RC updates shown above will get executed. In this case, injected RC increments for the throwing statement should not happen, because an exception-throwing s is assumed to create no side effects against the program's external state, as stated above. However, among the RC decrements, those that operate on the local references that die across s should still be performed.

Thus, at block 770, RC decrements are inserted into exception headers for any basic block which could throw an exception. In one implementation, for a basic block B with an exception header B', RC decrements are made against the set of references $$D' = \left( live_{in}(B) \cup \left( \bigcup_{s \in B} defs_{must}(s) \right) \right) - live_{in}(B')$$

where $live_{in}(B)$ and $live_{in}(B')$ are the live sets on entry to B and B'. The RC decrements are inserted into B'.

However, at execution time, RC decrements on a subset of D' will occur in B before an exception is actually thrown. To forestall another decrement in B' on references that have already died in B, in one implementation the RC_ operation is imparted the following semantics: it resets its operand reference to null after decrementing the reference count of the targeted object. This solution naturally works because the RC_ operation is always introduced at the death point of its operand. Under this implementation, the null assignments made during the process of block 850 are not necessarily required.

3.4 Examples of IR with Injected Eager RC Updates

Specific examples of concrete instructions handled by the above-described techniques are getfield in the Java language and ldfld in MSIL (Microsoft Intermediate Language). An IR representation of either is o.f, where o is a local reference and f a field. As noted above, from the point of view of the injection process, this is considered a non-call instruction. As such, the following is an example of code emitted by the compiler in a specific instance:

$$o := o.f \quad \Rightarrow \quad \triangleright \ddot{i}_1 := o$$
$$o := o.f$$
$$\triangleright RC_+(o)$$
$$\triangleright RC_-(\ddot{i}_1)$$
$$\triangleright RC_-(d_1)$$
$$\triangleright RC_-(d_2)$$
$$\vdots$$
$$\triangleright RC_-(d_m)$$

In this example, $defs_{must}(s)=\{o\}$, $uses_{may}(s)=\{o\}$ and $ldefs(s)=\{\&o\}$. Since $L(defs_{must}(s))=ldefs(s)$, the code generated corresponds to that generated by the process of blocks 810-840 of FIG. 8.

Another example is the IR instruction cmpxchg, which mimics the compareExchange method of the System.Threading.Interlocked class in .NET. cmpxchg takes an interior pointer p to a reference, a pair of references x and y and compares x with the reference at p for equality. If equal, the reference at p is replaced by y and the original reference at p is returned. If unequal, only the reference at p is returned. The following shows the code after execution of the insertion process, which regards the statement as a non-call instruction:

$$r := cmp \times chg(p, x, y) \quad \Rightarrow \quad \triangleright \ddot{i}_1 := {}^*p$$
$$\triangleright \ddot{i}_2 := {}^*(\&r)$$
$$r := cmp \times chg(p, x, y)$$
$$\triangleright RC_+({}^*p)$$
$$\triangleright RC_+({}^*(\&r))$$
$$\triangleright RC_-(\ddot{i}_1)$$
$$\triangleright RC_-(\ddot{i}_2)$$
$$\triangleright RC_-(d_1)$$
$$\triangleright RC_-(d_2)$$
$$\vdots$$
$$\triangleright RC_-(d_m)$$

In this example, $defs_{must}(s)=\{r\}$ and $ldefs(s)=\{p,\&r\}$. Thus, depending on whether an alias analysis can prove that p always equals &r, either of the two patterns generated in the process 800 of FIG. 8 could be generated. The code shown here is when $L(defs_{must}(s)) \neq ldefs(s)$.

It is also worth noting that two optimizations are possible on the injected code in this example. First, *(&r) is replaceable by r. Second, $RC_+(*(\&r))$ and $RC_-(\ddot{i}_1)$ cancel out because after the cmpxchg operation, r equals $\ddot{i}_1$. Given an optimizing compiler, these optimizations could create increased efficiencies in the eager RC-instrumented program.

4. Examples of RC Subsumption Analysis
4.1 Examples of RC Subsumed References

FIGS. 9a to 9d illustrate an example of reference-counting subsumption. The example is based on the following IR, which displays code after the eager RC update insertion process is complete. In the example, y's last use is in line 5 and x's is in line 7.

| 1 | $x := \ldots$ |
| 2 | $\triangleright RC_-(x)$ |
|   | $\vdots$ |
| 3 | $y := x$ |
| 4 | $\triangleright RC_+(y)$ |
|   | $\vdots$ |
| 5 | $\ldots := \ldots y \ldots$ |
| 6 | $\triangleright RC_-(y)$ |
|   | $\vdots$ |
| 7 | $\ldots := \ldots x \ldots$ |
| 8 | $\triangleright RC_-(x)$ |

Figure 9A:
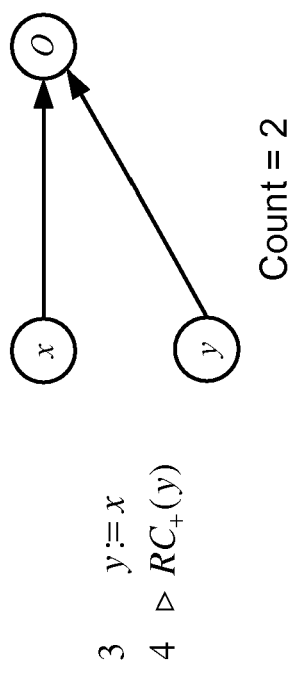
FIGS. 9a-9d are diagrams showing an example of a reference which is RC subsumed by another reference.
Figure 9B:
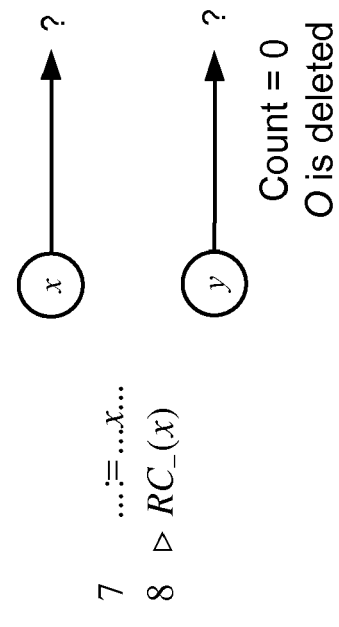
Figure 9C:
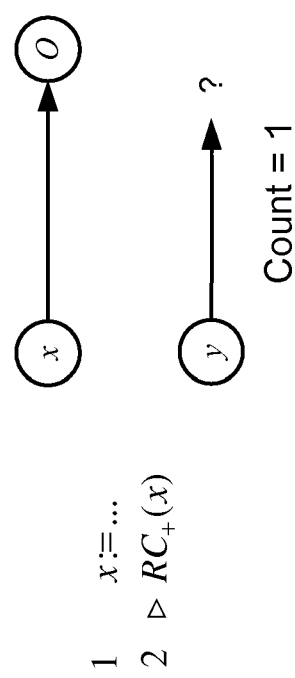
Figure 9D:
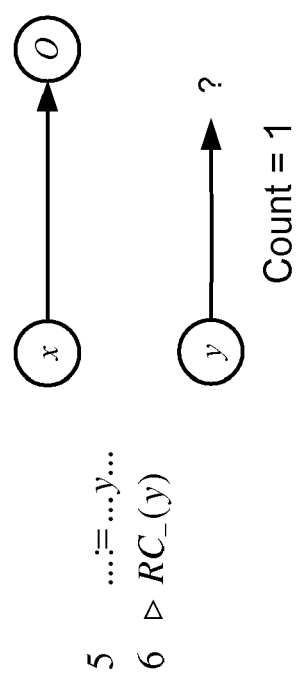

In the example, FIGS. 9a-9d shows the state of the two references x and y as they are defined to point to an object O by the code example given above. In FIG. 9a, lines 1 and 2 have executed, and thus x has been assigned to refer to O, and y's referenced object is unknown or does not exist. FIG. 9a also shows the reference count on O to be 1, because of the RC increment in line 2 (for the sake of simplicity, the example assumes no other references point to O). Next, in FIG. 9b, y has been assigned to refer to the same object as x. At this point, both y and x refer to O and the reference count on O has been incremented to 2. Then, in line 5 of FIG. 9c, y is used for the last time in the function, and in line 6, there is an RC decrement on y due to the eager nature of the RC updates. This means, as FIG. 9c shows, that currently only x refers to O, and the reference count on O is back to 1. Finally, by FIG. 9d, lines 7 and 8 have executed, which causes the last use of x to execute, and therefore a decrement to execute on x, which brings the count for O to 0, and causes the reclamation of O's memory.

Altogether, FIGS. 9a-9d demonstrate that, as far as the reclamation of O's allocated memory is concerned, the RC updates to y do not affect the deletion of O. Because y points to the same object as x in its live range from Line 3 to Line 6 (note that this is the "new" live range of y, as extended by the inserted RC decrement on y), and since this live range is contained in that of x, the RC updates on Lines 4 and 6 are superfluous to the garbage collection of O. This redundancy holds true even in a multithreaded, multiprocessor setting. Herein, we say that "y is RC subsumed by x" to describe this state of affairs.

It turns out that of the RC updates introduced into real programs by the eager RC insertion procedures described above, a large number are on local references that are RC subsumed by local references on which RC updates are also introduced. For instance, the RC updates on formal references are often redundant because formal reference parameters are usually RC subsumed by actual reference parameters. The goal of the RC subsumption analysis described herein is to locate such subsumed references. An RC subsumption optimization would then remove RC updates on these references, resulting in fewer garbage collection-related calls during program execution and therefore increased throughput.

While the discussion above is given in the context of eager RC updates, RC subsumption can also occur when RC updates are inserted according to classic RC collection schemes. As an example, consider the IR

```
1   x := newobj()
    ⋮
2   ▷ RC₊(x)
3   ▷ RC₋(y)
4   y := x
5   ▷ RC₋(y)
6   y := null
    ⋮
7   ▷ RC₋(x)
8   x := null
``` in which newobj( ), as before, returns a new object with reference count of 1, and in which RC updates are inserted according to a classic RC collection scheme. Since y points to the same object as x in its live range from Line 4 to Line 5, and since this live range is contained in the live range from Line 1 to Line 7 of x, the RC updates on Lines 2 and 5 are superfluous. (Note that the decrement against y on Line 3 is not superfluous, as it is performed to decrement the reference count of the object that y is about to be swung away from due to the assignment on Line 4.) Thus, as this example shows, RC subsumption can also occur when RC updates are inserted according to a classic RC collection scheme.

4.2 Examples of Previous Techniques

Related techniques attempted to take advantage of the notion of subsumption by defining a local reference y as being always RC subsumed by a local reference x, if:

A1: every live range of y is contained in a live range of x;
A2: neither x nor y can be redefined when y is live; and
A3: the set of objects reachable from y is always a subset of the set of objects reachable from x.

The definition's aim was the efficient identification of lifetime-subsumed references, beyond those detected by past work. These references are valuable to nondeferred RC collectors, because they do not have to be counted.

This definition, which will be referred to as "enveloping RC subsumption" ("ERCS") herein, led to an optimization that was somewhat effective on many programs. Nonetheless, it covered only a limited set of scenarios. Moreover, known algorithms for finding ERCS references (roots that fulfill the ERCS definition) were overly conservative. A conservative algorithm for an already conservative definition resulted in missed opportunities in some test results A shortcoming of ERCS is that, for a variable to be non-trivially subsumed, it must always be reachable from a particular variable different from itself. For example, consider the following code fragment:

```
1    RC₊(e₁)
2    x := e₁
3    RC₊(e₂)
4    y = e₂
5    RC₊(x.f₁)
6    z = x.f₁
     ⋮
7    RC₊(z)
8    RC₋(y.f₂)
9    y.f₂ := z
10   RC₋(x.f₁)
11   x.f₁ := null
12   ... z ...
13   ... y ...
14   ... x ...
15   RC₋(z)
16   RC₋(y)
17   RC₋(x)
```

This consists of mutator code, and the RC updates that a classic RC collection scheme would require. If x, y and z are defined for the first time on Lines 2, 4 and 6, and used last on Lines 14, 13 and 12 respectively (ignoring the RC update usages), then even if we assume that the fields $f_1$ and $f_2$ reside in thread-local objects, the object targeted by z will not always be reachable from x or y alone. Thus, despite z satisfying Provision A1 above, it is not an ERCS reference since Provision A3 does not hold relative to x or y alone. And yet, preferably, z should be subsumed since in the example it will always be reachable from either x or y.

Another example is the code fragment below:

```
1    RC₊(e₁)
2    u := e₁
3    RC₊(u.f₁)
4    w := u.f₁
5    RC₊(e₂)
6    v := e₂
     ⋮
7    RC₊(u)
8    RC₋(v.f₂)
9    v.f₂ := u
10   RC₋(u)
11   u := null
12   ... w ...
13   RC₋(w)
14   w := null
15   ... v ...
16   RC₋(v)
```

In this example, neither Provisions A3 nor A1 hold for any of the variables. Hence, there would be no subsumption by ERCS, even though the RC updates for w can be avoided if the coverage jointly provided by u and v were considered.

Another source of ERCS conservatism is that, of the two clauses in Provision A2, the second is constraining. The first is that y should never be live through a redefinition of itself. It is used in ERCS to prevent a dangling reference problem. The second is that y should never be live through a redefinition of x. It exists to eliminate the possibility of y's target becoming unreachable from x due to indirect writes of x through pointers. This requirement of ERCS is unnecessary if Provision A3 can be computed more precisely.

In another limitation, ERCS references were computed by finding local references that "overlook" an object targeted by a live local reference y, from just before a statement s until their death or possible redefinition. This overlooking root set of y at s was defined in these past techniques as:

$$\Box(s, y) = \{u \mid u \in R \wedge y \in live_{out}(s) \wedge y \xrightarrow{s_{out}} \omega \wedge \quad (4.1)$$
$$\omega \in \Re(u) \text{ on all paths from } s_{in} \text{ until}$$
$$u \text{ dies or could be redefined}\}$$

where R is the set of local references, $live_{out}(s)$ is the set of local references that are live just after s, $$y \xrightarrow{P} \omega$$

means y points to the object $\omega$ at program point P, and $s_{in}$ and $s_{out}$ are program points just before and just after s.

Because a straight calculation of $\Box(s,y)$ by Equation (4.1) at every possible definition of y is computationally expensive, one implementation of the ERCS techniques approximated it by a peephole examination of a small context around a statement s. For example, in this technique, an approximate $\Box(s,y)$ for the statement y:=x.f is {x}, if x is known to only target thread-local objects, and if x.f is not written into before x dies.

Although a peephole examination could be useful for a number of important statements, opportunities were missed. For y:=x.f, since ascertaining whether x.f is written into before x dies might require an inspection of all basic blocks reachable from the basic block B in which s occurs, the opportunity was conservatively identified by restricting the inspection to just the basic block B. The approach was to not consider y for subsumption if x did not die before the end of B.

To summarize, subsumption techniques were previously limited both in the opportunities they recognized and the flow-insensitive manner in which they were calculated.

5. Examples of Overlooking Subsumption 5.1 Examples of General Overlooking Subsumption Processes The processes which follow utilize a less conservative subsumption definition based on the concept of overlooking roots. To restate, the overlooking relation can be thought of as follows: A root x overlooks a root y at a program point P if whatever is the object reachable from y at P is also reachable from x at P without going through y.

This overlooking roots binary relation is irreflexive and transitive at any P. In implementations described herein, a set of ordered pairs that fulfills the overlooking relation at a program point P is denoted as olook(P). When (x,y)∈olook (P), x is called the overlooker or the overlooking root herein, and y the overlookee or the overlooked root herein. Generally, (x,y) as used herein is called an overlooking pair.

Figure 10:
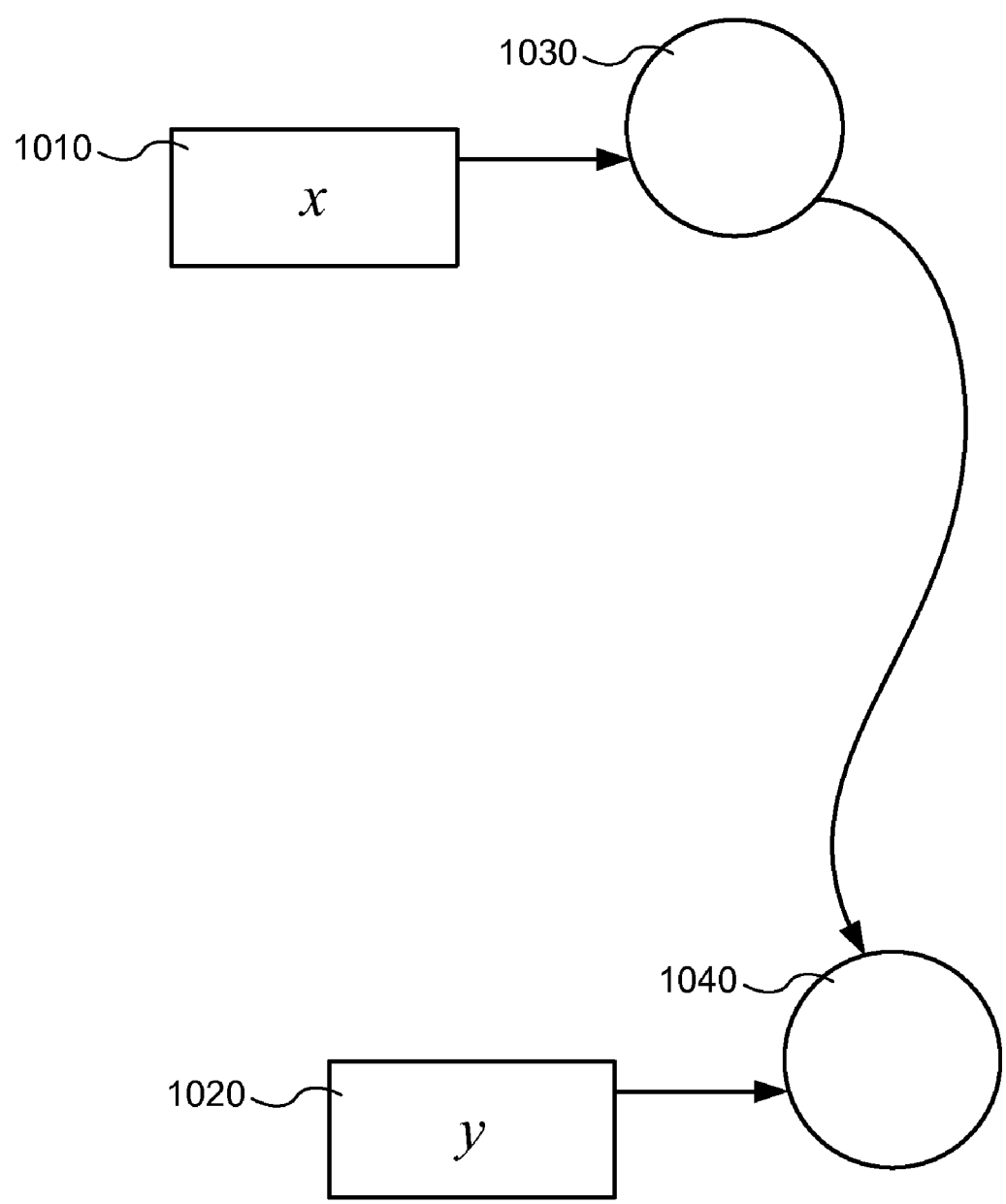
FIG. 10 is a diagram showing an example of a root which is overlooked by another root.

FIG. 10 is a block diagram which illustrates an example of a relation whereby a root x overlooks the root y. Boxes 1010 and 1020 respectively depict roots x and y in a program, and circles 1030 and 1040 represent objects in the program's heap. The arrows represent points-to relations from roots to heap objects, and the curved arc a path from object 1030 to object 1040 in the heap. Thus, because object 1040, which is pointed-to by root y (1020) can also be reached through object 1030 from root x (1010), it is said that "x overlooks y."

Using this definition, the broader idea of overlooking RC subsumption, or ORCS, can be defined as a kind of subsumption more general than ERCS. In ORCS, a live range l of a local reference y is considered subsumed according to ORCS, if:

B1. y is overlooked by live roots at every point in l; and
B2. y cannot be redefined in l.

If these rules hold for a live range l, then l is referred to as an ORCS live range. Hence, the live ranges of y need not be wholly contained in the live ranges of other variables for subsumption to occur. In addition, the object targeted by y need not always be reachable from the same root. Thus, ORCS accommodates a more dynamic view of reachability than ERCS. Provision B2 exists to prevent dangling references, similarly to the reason as for the first clause in Provision A2.

Referring back to the code examples discussed above in Section 4.2, it may be noticed that, although there is no subsumption in these examples according to ERCS, z and w will be subsumed according to ORCS. Thus ORCS provides greater opportunities for removing unnecessary RC updates than does ERCS.

In one implementation, the olook sets mentioned above contain path-insensitive information. If (u,v)∈olook(P), then u overlooks v at P irrespective of the path taken to reach P.

This is stronger information than is necessarily needed for every implementation of ORCS optimization. What is used, according to the propositions above, is a set of live roots at each point, of which at least one is guaranteed to be an overlooker of a root in question. Techniques described herein with reference to FIG. 22 perform an analysis for deriving this information, which in one implementation uses the overlooking roots analysis as a client service.

Figure 11:
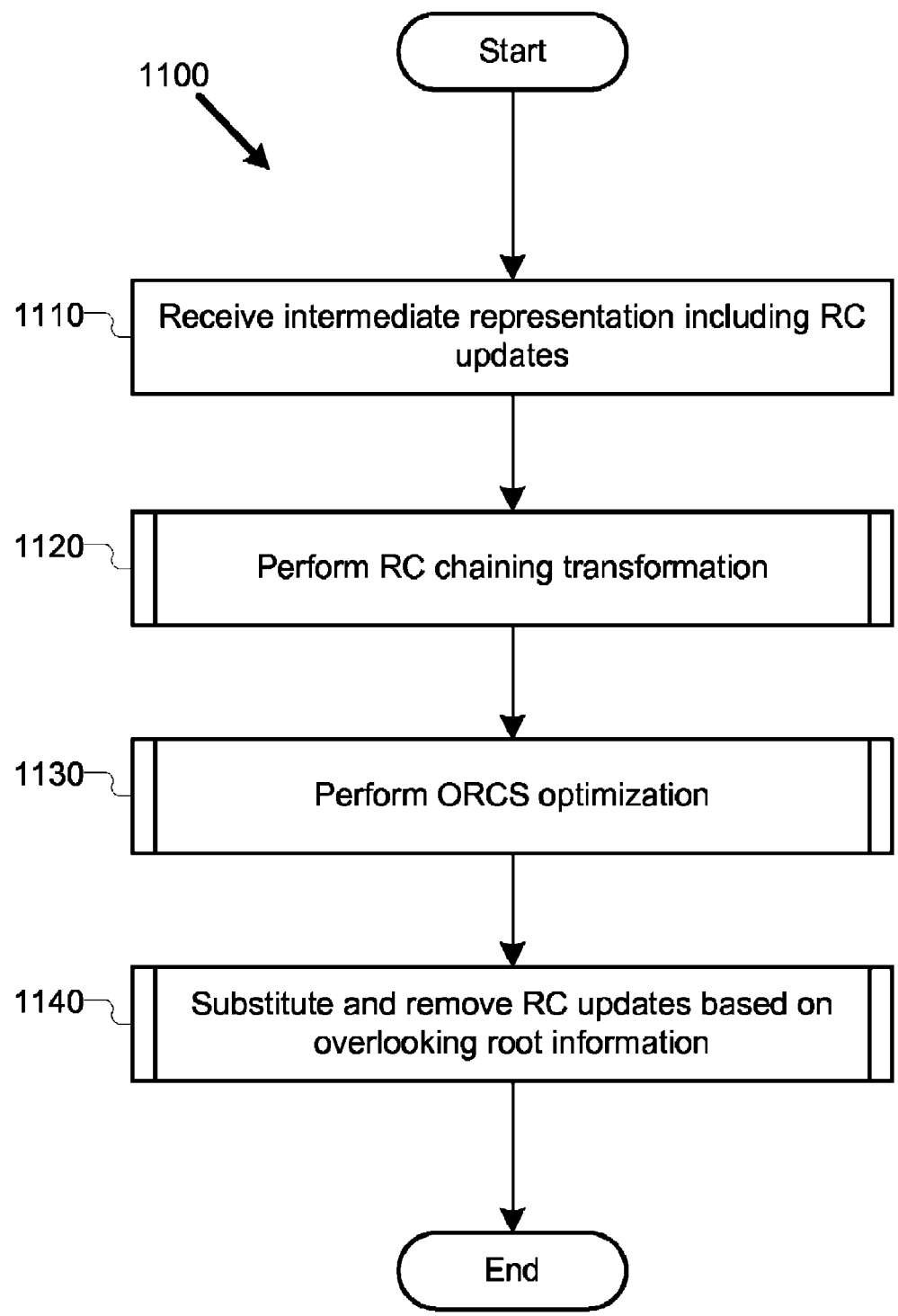
FIG. 11 is a flowchart illustrating an example process for utilizing overlooking roots to optimize RC updates in a program.

FIG. 11 illustrates an example process 1100 performed by the overlooking-root-based optimizations module 140 for removing or specializing RC updates based on overlooking root information. In one implementation, process 1100 corresponds to block 370 of FIG. 3. In various implementations, the illustrated process blocks may be merged, divided into subblocks, or omitted. The process begins at block 1110, where the overlooking-root-based optimizations module 140 receives a program IR that includes RC updates. Typically, the RC updates are provided by the eager RC insertion procedures described above, but in another implementation, process 1100 can be performed on a program that comprises RC updates generated through a different mechanism such as that for achieving classic RC collection.

Next at block 1120, the module performs an RC chaining transformation on the program. This is performed, according to some implementations, because certain RC updates can be identified ahead of time as being extraneous because they satisfy RC chaining conditions. By adding roots which overlook these target roots, needless updates to the target roots can be taken out during the same RC update removal and specialization process performed for the RC updates added during the eager injection process described above. Particular examples of processes of RC chaining transformations are described below with reference to FIG. 16.

Next, at block 1130, the redundant overlooking roots subsumption module 260 performs an ORCS analysis and removes RC updates for references which satisfy the ORCS provisions. Particular examples of processes of ORCS analysis are described below with reference to FIG. 19. Finally, at block 1140, optimized RC updates are substituted for existing RC updates based on state knowledge obtained from overlooking roots analysis and maintained in overlooking root relationships. Additionally, at this block RC updates which were not removed earlier during the ORCS processes may be removed based on this information. Particular examples of this process are described below with respect to FIG. 21. The process then ends.

5.2 Examples of Overlooking Root Analysis

Figure 12:
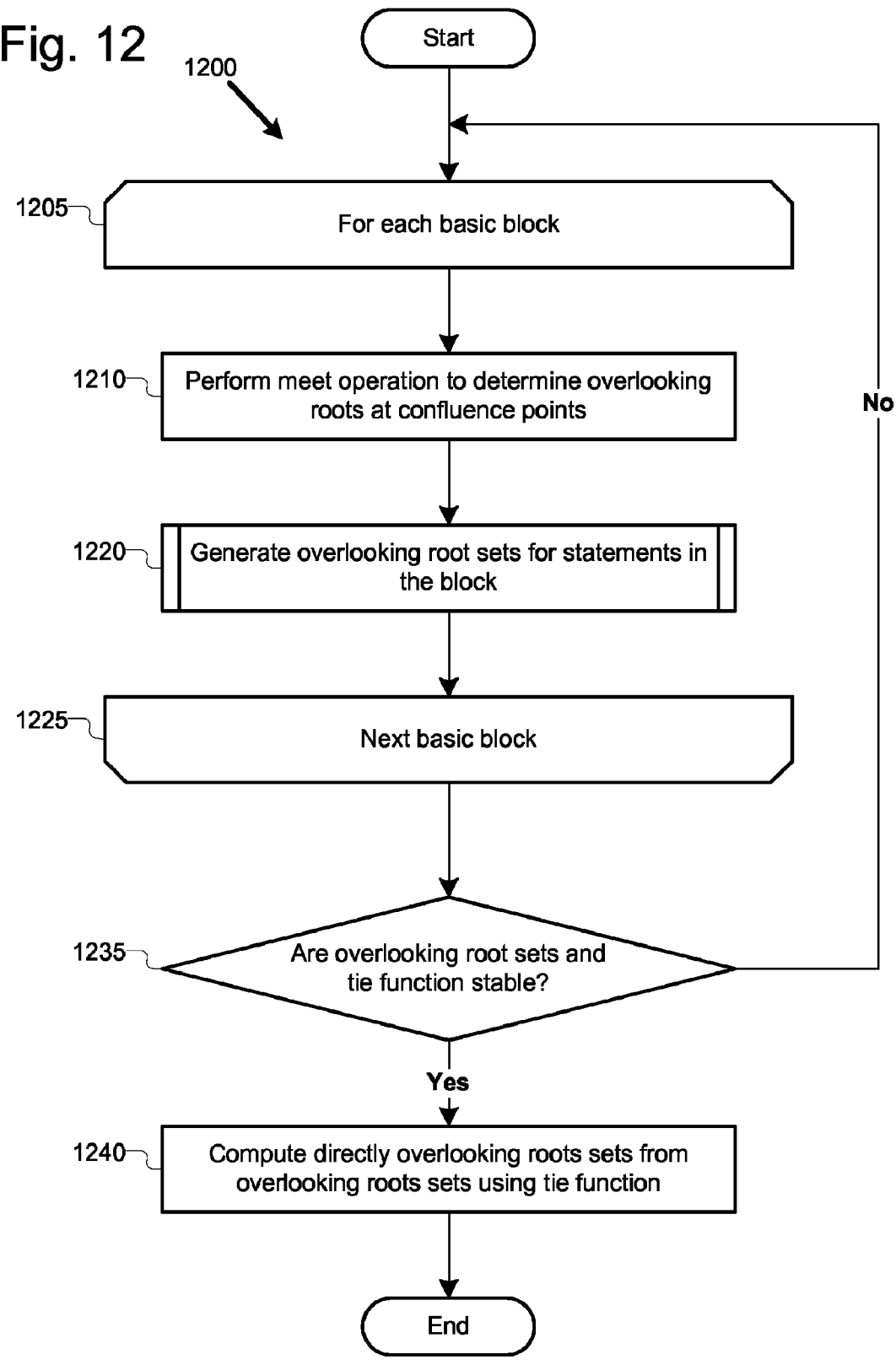
FIG. 12 is a flowchart illustrating an example process for analyzing a program to determine overlooking and directly overlooking roots sets.

Before describing specific uses of overlooking roots information, such as RC chaining or ORCS, it is useful to understand processes by which the overlooking roots information is obtained. FIG. 12 illustrates an example 1200 of such a process, which is performed in one implementation by the overlooking roots analysis module 240. Generally, the analysis obtains olook(P) for points P in a procedure. As will be described herein, at the cost of a constant amount of extra storage, the analysis also provides dolook (P), the set of direct overlookers at P. In various implementations, the illustrated process blocks may be merged, divided into subblocks, or omitted. The process begins at a loop 1205 for each basic block in the program. Inside the loop, the module performs a meet operation for any already-determined overlooking root sets at any confluence points. One particular implementation of such a meet operator for performing this meet operation is described below with reference to section 6.7. Next, at block 1220, the module generates overlooking root sets for statements in the block. The process then repeats at block 1225. The remaining blocks of FIG. 12 are discussed below, following a discussion of FIGS. 13 and 14, which provide examples of the process of block 1220.

Figure 13:
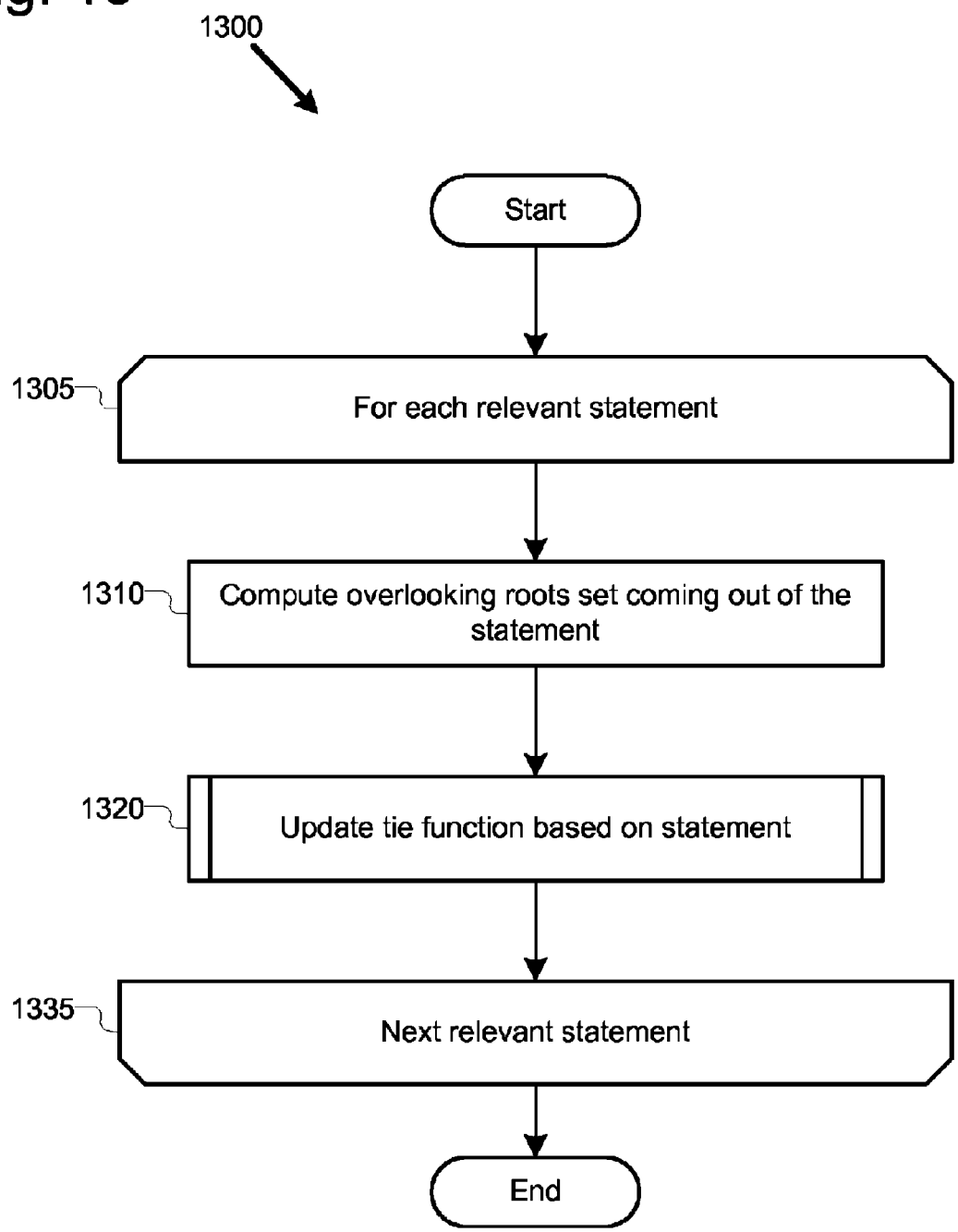
FIG. 13 is a flowchart illustrating an example process for analyzing a basic block to determine overlooking roots sets.

FIG. 13 illustrates an example process 1300 performed by the overlooking roots analysis module 240 for generating overlooking root sets. In one implementation, process 1300 corresponds to block 1220 of FIG. 12. In various implementations, the illustrated process blocks may be merged, divided into subblocks, or omitted.

As mentioned above with respect to FIG. 12, generally, the analysis of FIG. 13 obtains olook(P) at any point P in a procedure. This is in some implementations, referred to as "must" information, however the use of the term "must" should not be read to demand any particular implementation requirements, but instead is an artifact of the definitions of olook(P). In some implementations, in order to increase efficiency, the analysis maintains the information per basic block, and computes it on demand per statement.

In one implementation, the analysis is intraprocedural. It handles invoked procedures using reference mutation summaries. A reference mutation summary for a procedure F is understood to be the set of reference fields and reference array types that could be mutated by F.

The illustrated process begins in a loop block 1305 that is performed for each statement. Again, in various implementations, this may not be performed for every statement, but instead may be kept for larger groups, such as basic blocks, and then computed on demand for each statement. In the illustrated implementation, this is performed only for "relevant" statements. Examples of relevant statements are given below. At block 1310 the set $olook_{out}(s)$, which is the olook set just before statement s is created. In one implementation, the set is given by $$olook_{out}(s)=(olook_{in}(s)-kill(s)) \cup gen(s) \qquad (5.1)$$

where $olook_{in}(s)$ is the set of overlooking roots just before s, and kill(s) and gen(s) are the sets of roots that are made by s to stop overlooking a root, and that are made by s to overlook a root, respectively.

In one implementation, when computing $olook_{in}(s)$, there are three possibilities. If s is preceded by a statement s' in its basic block B, then $olook_{in}(s)$ equals $olook_{out}(s')$. Otherwise, $olook_{in}(s)$ equals the meet of the $olook_{out}$ sets for the last statements in the predecessor basic blocks of B. If B has no predecessors, such as the entry basic block of the control-flow graph (CFG), $olook_{in}(s)$ equals a special initializing set called $olook_T$. The elements in $olook_T$ are the overlooking root pairs on entry to a procedure. For every local reference r that is not a formal reference, it contains the pair (T,r), where T denotes an "undefined" virtual root. This is because these references have initially undefined values. For every formal reference z, $olook_T$ contains the pair (ẑ,z), where ẑ is a virtual root that models the actual parameter corresponding to z. In one implementation, there are no other pairs in $olook_T$, because all the remaining roots, such as the static and virtual roots (including ⊥), do not have initially known overlookers.

However, while equation (5.1) provides a beginning for computing $olook_{out}(s')$, the equation by itself is not efficient because $olook_{out}$ becomes vacuous in the face of called procedures that may mutate the heap. For example, consider a call statement y:=F(), where the callee F is known to mutate a reference field f. Because f may lie on the heap path by which one root overlooks another, the kill set for the statement, in the absence of more knowledge, would have to be at least $olook_{in}(s)$. For such a conservative estimate, however, all incoming information for the statement would be lost.

This problem is not specific to callees that may mutate the heap. It exists for any instruction that may mutate the heap. Its ramifications in the procedure invocation case, however, are extreme. In another example, the case of a statement like y.f:=x, not all of the incoming information has to be killed. This is because, at the very least, y will overlook x after the statement (assuming that f is a thread-safe or read-only field).

5.2.1 Examples of Tie Functions

The heap mutation problem can be addressed using the concept of tie fields and tie array types. A reference field f is said to "tie" a root u to a root v if there exists a point P in the procedure at which f occurs on every heap path by which u overlooks v at P. Similarly, a reference array type A is said to tie u to v if an instance of A occurs on every heap path by which u overlooks v somewhere in the procedure. A tie function T can then be constructed such that given u and v, T(u,v) is the set of all fields and array types that may tie u to v.

Generally, tie fields and tie array types are links in the heap that, when severed, cause the overlooking relation between a pair of roots to be broken. Hence, if a field or an instance of an array type in T(u,v) is updated, then the overlooking relation between u and v could be broken.

One implementation of the overlooking roots analysis described herein keeps one tie function per procedure. T is initialized to map every pair of roots to the empty set ∅. Then, as new overlooking pairs are generated with every application of equation (5.1), the tie function is updated to include new fields and array types. Once added to an image of T, these fields and array types are never removed; this implementation conforms to a weak update policy.

A potential drawback of weak updating is that it can rapidly dilute the usefulness of the gathered information. The tie function could be updated for each pair in gen(s), but that may needlessly dilute the tie information. In particular, if (u,v) ∈olook$_{in}$(s) and (u,v)∉kill(s), then there is no need to update T(u,v), because whatever ties u to v after s already exists in T(u,v) before s. Hence, in a general fashion, T is updated as:

$$T(u, v) \leftarrow T(u, v) \cup \begin{cases} \{f\} & \text{if } f \text{ may tie } u \text{ to } v \\ \{A\} & \text{if } A \text{ may tie } u \text{ to } v \end{cases} \quad (5.2)$$

for $(u, v) \in gen^*(s)$, where $$gen^*(s) = gen(s) - olook_{in}^*(s) \quad (5.3)$$

and $$olook_{in}^*(s) = olook_{in}(s) - \text{kill}(s). \quad (5.4)$$

At block 1320 of FIG. 13, the overlooking roots analysis module 240 performs this updating. Particular examples of the updating are described in greater detail below with respect to FIG. 14.

5.2.2 Examples of Determining Overlooking Roots

The main benefit of the tie function is that it can be used to enable the kill set for a statement to be more specialized, which in turn prevents the olook$_{out}$ set from losing more information than is necessary. For instance, as described below, in the case of procedure calls, the kill set need only be a subset of {(u,v)|T(u,v)≠∅}. Another use is in determining dolook sets, as described below.

As mentioned above, in the illustrated implementation, the iterated processes of blocks 1310 and 1320 are performed only on "relevant" statements. In various implementations, statements are deemed "relevant" if they can alter the olook sets. Irrelevant statements, such as those that only side-effect arithmetic variables, propagate their olook$_{in}$ sets to their olook$_{out}$ sets.

For the sake of brevity of description, the analysis described herein with respect to updating the tie functions and olook sets is described assuming all roots to be only references. In one implementation, this is in accordance with the Java programming model. In .NET implementations, roots can also be interior pointers to objects, but extending the descriptions herein to account for these pointers is straightforward.

Assuming x, y, u and v are local or static references, relevant statements can be divided into five categories:
 simple assignments: these are y:=x and y:=c, where c is a constant reference, like null or a string literal;
 allocations: this is y:=allocobj(T), where T is the type of the allocated instance;
 heap loads: these are y:=x.f and y:=x[e];
 heap stores: these are y.f:=x and y[e]:=x; and
 procedure invocations: this is y:=F( . . . ).

Figure 14:
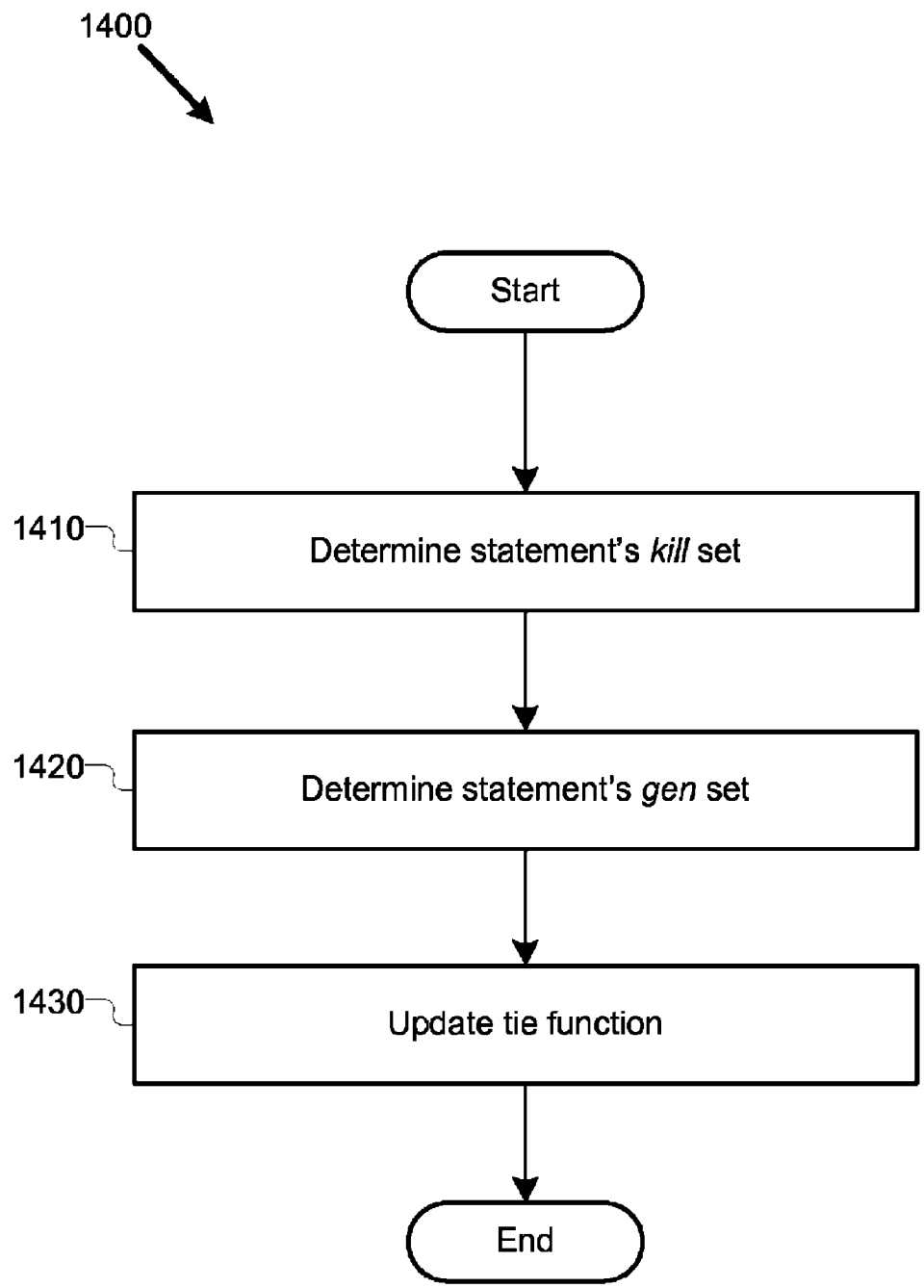
FIG. 14 is a flowchart illustrating an example process for updating a tie function based on a statement.

Examples of updating that are particular to each of these categories is described below in Section 6. However, the general process is shown in FIG. 14, which illustrates an example process 1400 performed by the overlooking roots analysis module 240 for updating a tie function. In one implementation, process 1400 corresponds to block 1320 of FIG. 13. In various implementations, the illustrated process blocks may be merged, divided into subblocks, or omitted.

The process begins at block 1410, where the statement's kill set is determined. In one implementation, this can be performed consulting the statement's olook$_{in}$ set and T. Next, at block 1420, the statement's gen set is computed. In one implementation, this can be performed using the statement's olook$_{in}$* set. Finally, at block 1430, the tie function T might be updated, at pairs in gen*(s). Particular examples of how statements in each of the categories affect the tie function and other sets are described below in Section 6.

Returning now to the process of FIG. 12, an overlooking roots set and tie function have been computed. It is worth noting, however, that changing an overlooking roots set can modify a corresponding tie function, or vice versa. Thus, the implementation uses what is sometimes referred to as a fixed-point analysis. The analysis iterates over all the statements, and computes the meet of the olook$_{out}$ sets at confluence points, as described below. This is done repeatedly until the olook sets no longer change (i.e., reach a fixed point). Thus, after generating overlooking root sets, the process continues to decision block 1235, where it determines if the sets are yet stable (owing to the changes affected by each set on the other as described above). If the sets are not yet stable, the process repeats to block 1205. If the sets are now stable, the process continues.

After the sets are determined to be stable, at block 1240 the module computes "directly" overlooking roots sets from the overlooking roots sets using the computed tie functions obtained during the fixed-point analysis. It is thus useful to define a "directly" overlooking roots binary relation:
 A root x "directly overlooks" a root y at a point P if whatever is the object targeted by y at P is also targeted by x at P, and x and y are distinct.

In most situations, this relation is an aliasing relation. One exception is when virtual roots target multiple objects at the same time.

In one implementation, this is computed as:

$$dolook_{in}(s) = \{(u,v) | (u,v) \in olook_{in}(s) \wedge T(u,v) = \emptyset\} \quad (5.5)$$

In one implementation, it is preferable to keep two maps for T, to speed up tie function lookups. The first is for querying all the ties for a root pair, as in Equation (5.2). The second is for determining all the pairs tied by a field or type, which is utilized when determining particular kill sets as described below. After computing directly overlooking roots, the process then ends.

5.3 Examples of RC Chaining

Figure 15:
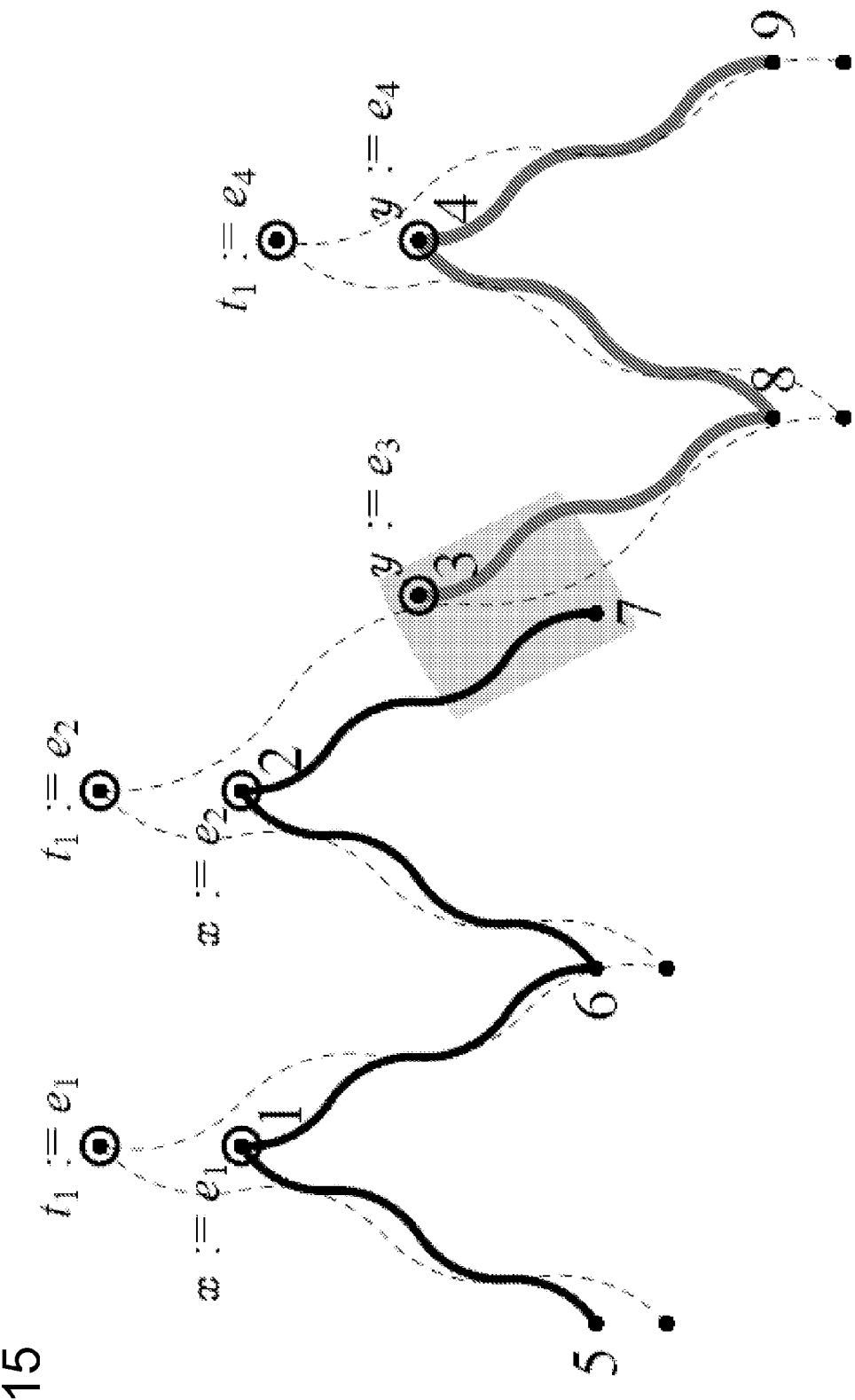
FIG. 15 is a diagram showing an example of RC chaining.

FIG. 15 is an illustration of live ranges for two roots, x and y. x is defined at Points 1 and 2, and dies at Points 5, 6 and 7. y is defined at Points 3 and 4, and dies at Points 8 and 9. The live ranges overlap in the shaded area of the figure. In unoptimized, nondeferred reference counting, there would be increments against x at points 1 and 2, and decrements against it after points 5, 6 and 7. Likewise, there would be increments against y at points 3 and 4, and decrements against it after points 8 and 9. However, if x and y target the same object in the overlapping portion of their live ranges, then the increment against y at point 3 can be coalesced with the decrement against x at Point 7.

In existing techniques, compile-time RC update coalescing is restricted to within contiguous RC update sequences occurring within basic blocks. In techniques described herein, however, a transformation referred to as RC chaining is utilized which provides a more general coalescing effect that can be achieved by applying an ORCS optimization on the transformed code.

It should be noticed that the RC updates for FIG. 15 cannot be optimized using ORCS in their current state. Let $l_u$ be a live range of the root u, and $l_v$ a live range of the root v. $l_u$ and $l_v$ can be said to be "RC chained" if:

C1. there are points at which $l_u$ and $l_v$ interfere (i.e., a definition point of $l_u$ lies within $l_v$, or vice versa);
C2. u and v cannot be redefined in $l_u$ and $l_v$ respectively; and
C3. u and v directly overlook each other at the intersection points of $l_u$ and $l_v$.

Figure 16:
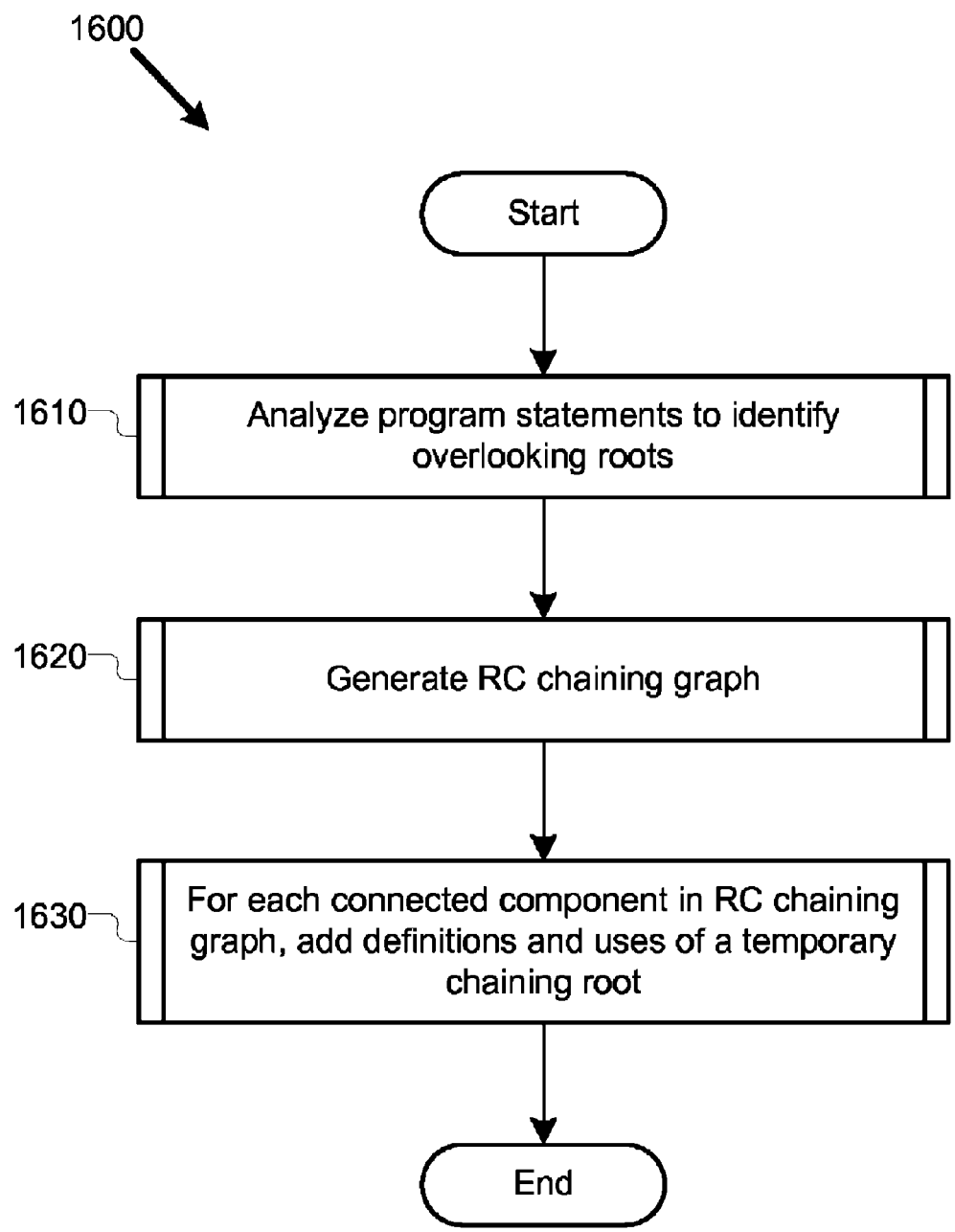
FIG. 16 is a flowchart illustrating an example process for performing an RC chaining transformation.

FIG. 16 illustrates an example process 1600 performed by the RC chaining module 250 to perform an RC chaining transformation. In one implementation, process 1600 corresponds to block 1120 of FIG. 11. In various implementations, the illustrated process blocks may be merged, divided into subblocks, or omitted. In one implementation this process is repeated per every procedure.

The process begins at block 1610, where the module 250 utilizes the overlooking roots analysis module 240 to identify overlooking root relationships, in particular directly overlooking root relationships, which are used in subsequent RC chaining processes. Particular examples of this process are described above. Next, at block 1610 the module generates an RC chaining graph. An RC chaining graph $G_C = (V, E_C)$ is an undirected graph in which the nodes stand for live ranges, and in which the edges denote the RC chaining relationship described above.

Figure 17:
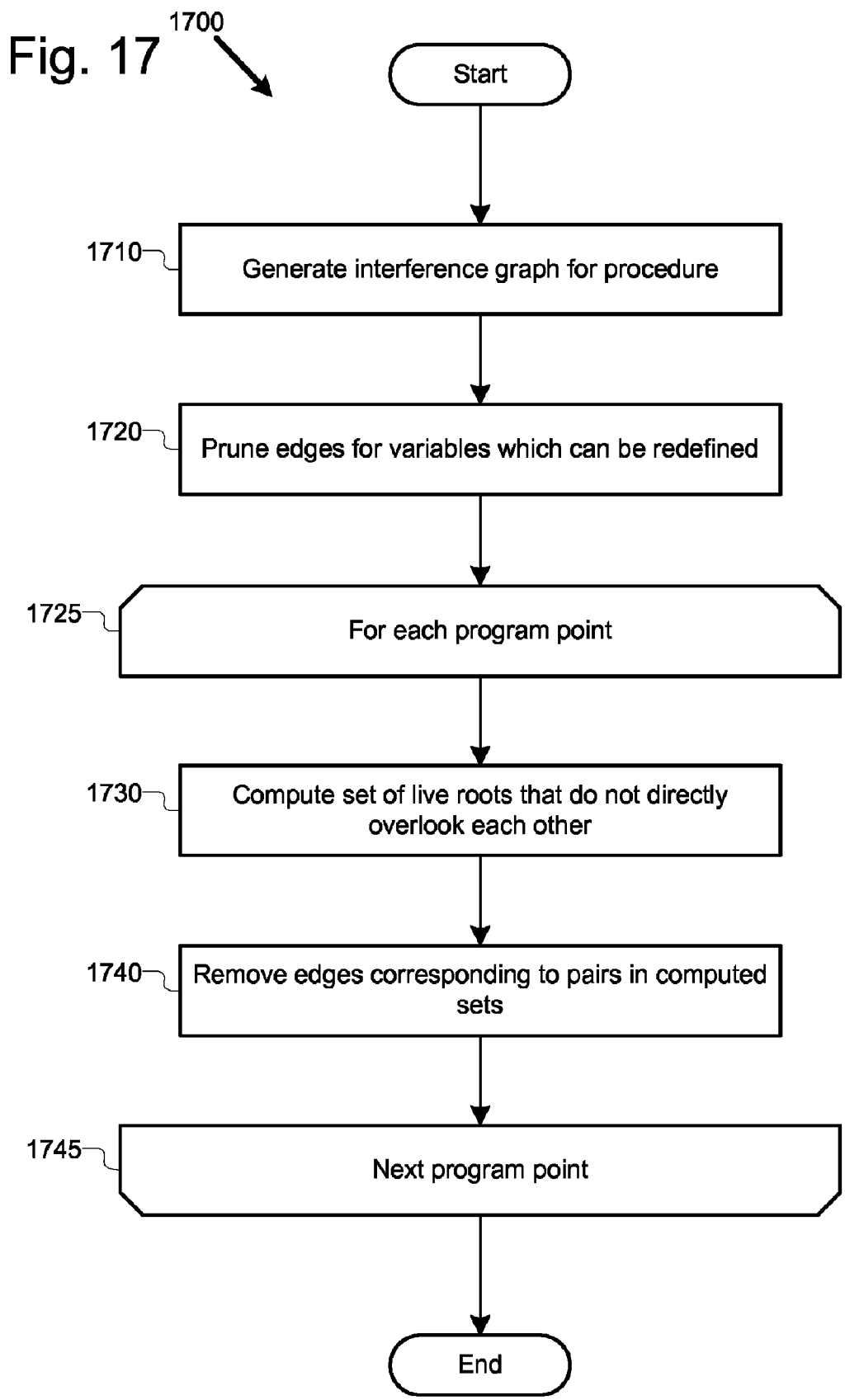
FIG. 17 is a flowchart illustrating an example process for generating an RC chaining graph.

FIG. 17 illustrates an example process 1700 performed by the RC chaining module 250 for generating an RC chaining graph. In one implementation, process 1700 corresponds to block 1620 of FIG. 16. In various implementations, the illustrated process blocks may be merged, divided into subblocks, or omitted. The process begins at block 1710 by first computing the interference graph $G_I = (V, E_I)$ for the procedure. Next, at block 1720, the module determines for each variable if that variable could be redefined in its live range l, if so, edges in $G_I$ incident on l are pruned out. The remaining edges represent live range pairs that satisfy provisions C1 and C2 above.

For the sake of argument, let the resulting graph be called $G_I'$. What is left is to remove edges so that provision C3 is satisfied. Thus, at block 1725, a loop begins for each program point. At block 1730, for program point P, the module computes a set:

$\Delta(P) = \{(l_u, l_v) | u \in \text{live}(P) \wedge (u,v) \notin \text{dolook}(P) \vee (v,u) \notin \text{dolook}(P))\}$, where live(P) is the set of live roots at P, and where $l_u$ and $l_v$ are the live ranges corresponding to u and v at P. Finally, at block 1740, edges occurring in $\Delta(P)$ are deleted from $G_I'$. The process then loops at block 1745 for the next program point. After all the program points are processed in this manner, the resulting graph is the RC chaining graph $G_C$.

By its construction, every connected component in the RC chaining graph represents a set of live ranges across which RC updates can be coalesced. Thus, returning to process 1600, the module next, at block 1630 utilizes the RC chaining graph to generate definitions and uses of a temporary chaining root $t_C$ against each connected component c in $G_C$. Generally, one implementation of this process makes assignments against $t_C$, and introduces fake uses of it so that its live range tightly spans all the live ranges in c. The assignments are such that $t_C$ aliases at every point the variables corresponding to the live ranges in c that are also active at that point. Later, when an ORCS optimization is applied on the transformed code, all the live ranges in c will be subsumed by $t_C$. Only RC updates against $t_C$ will be retained. The net effect equals a coalescing of the RC updates at the overlap points in c. After this generation, the process of FIG. 16 ends.

Figure 18:
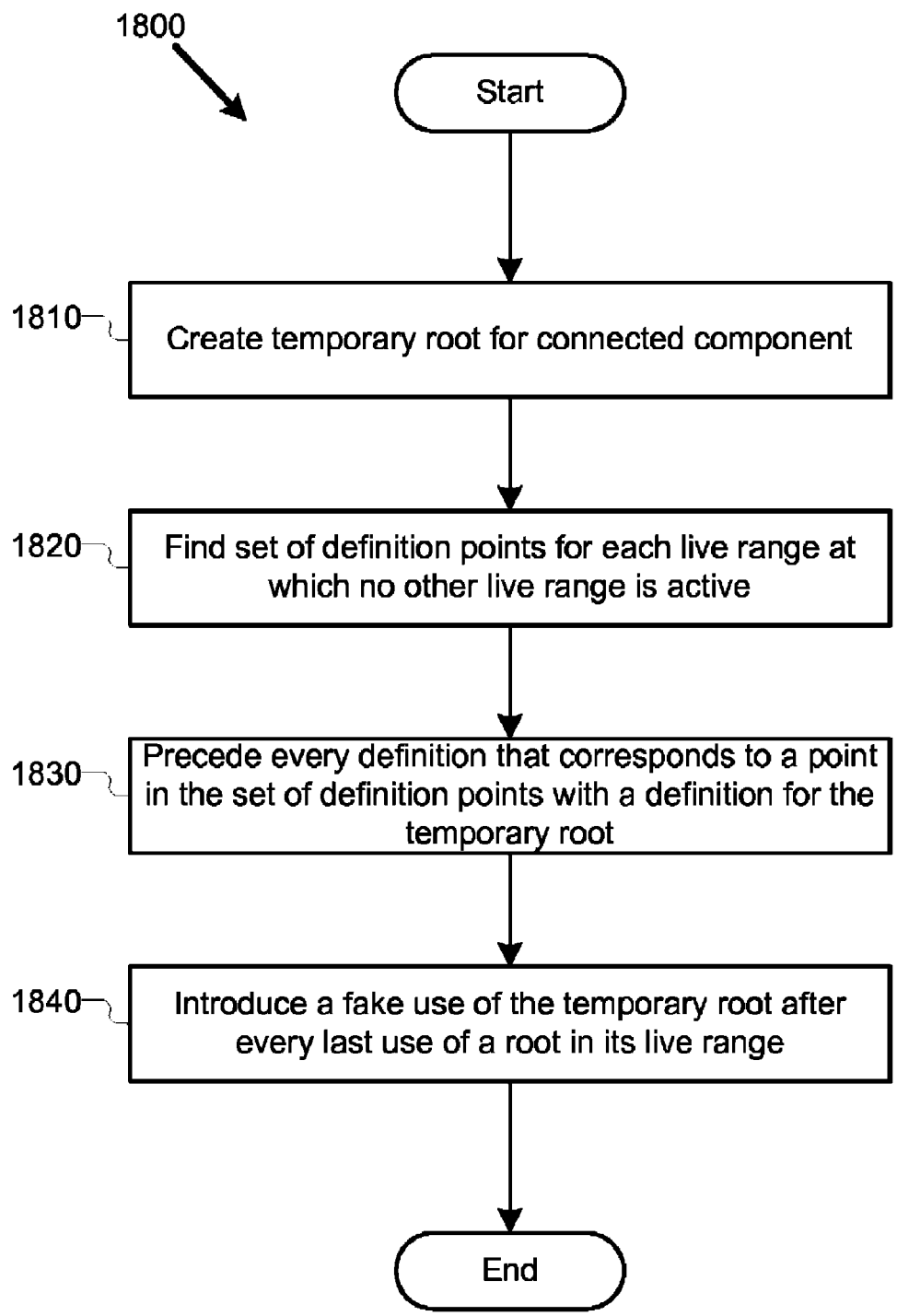
FIG. 18 is a flowchart illustrating an example process for adding definitions and uses of a temporary chaining root.

FIG. 18 illustrates an example process 1800 performed by the RC chaining module 250 for generating a chaining root. In one implementation, process 1800 corresponds to block 1630 of FIG. 16. In various implementations, the illustrated process blocks may be merged, divided into subblocks, or omitted. The process of FIG. 18 is illustrated for a single connected component c of $G_C$. Thus, implementations will repeat the process for various connected components. The process begins at block 1810, where a temporary $t_C$ is created for the connected component c in $G_C$. Next, at block 1820, for every live range $l_u$ in c, the module finds the set of definition points in that range at which no other $l_v$ in c is also active. Herein that set is called $D(l_u)$.

The process then continues to block 1830 where the module precedes every definition u:=e that corresponds to a definition point in $D(l_u)$ with a new definition $t_c:=e$. Finally, at block 1840, the module introduces a fake use of $t_C$ after every last use of u in $l_u$ (meaning every time u is used last in $l_u$). The process of FIG. 18 then ends.

The tightly-spanning live range of the chaining root created in process 1800 is illustrated in FIG. 15. In the illustrated example, it generates the single temporary $t_1$, since the example's RC chaining graph has a single connected component. The assignments $t_1:=e_1$, $t_1:=e_2$ and $t_1:=e_4$ are introduced before the existing definitions at points 1, 2 and 4. Uses of $t_1$ are introduced after points 5 to 9. A definition of $t_1$ is not introduced before point 3 because x is live there. The transformed result is a live range for $t_1$ that spans the two live ranges in the figure, and in which $t_1$ directly overlooks x or y or both. If an ORCS optimization is now applied to this example, the RC updates against x and y will be eliminated. The optimized result is as if the increment at point 3 is cancelled with the decrement at point 7.

Note that provision C3 uses the directly overlooking roots relation. If the general overlooking roots relation were used instead, either the reclamation characteristics of the original collection scheme could be affected or dangling references could be created. For instance, suppose that x overlooked y but did not alias it in the overlap region of FIG. 15. Then from point 7 to point 8, $t_1$ would hold on to the object targeted by a (dead) x. As for the converse, (i.e., y overlooking x but not aliasing it in the overlap region), y could become a dangling reference after point 3.

In an alternative implementation, the creation of a new spanning live range can sometimes be obviated by copy propagation. As an example, suppose that the live range of y in FIG. 15 only stretched from point 3 to point 8, and did not include the portion between points 4, 8 and 9. Then a copy propagator might be able to extend the live range of x from Point 7 to Point 8, hence rendering the creation of $t_1$ unnecessary. This could be beneficial since spanning live ranges like that of $t_1$ can increase the maximum number of mutually interfering live ranges, and therefore, can increase a procedure's register pressure.

5.4 Examples of Overlooking RC Subsumption Analysis

Figure 19:
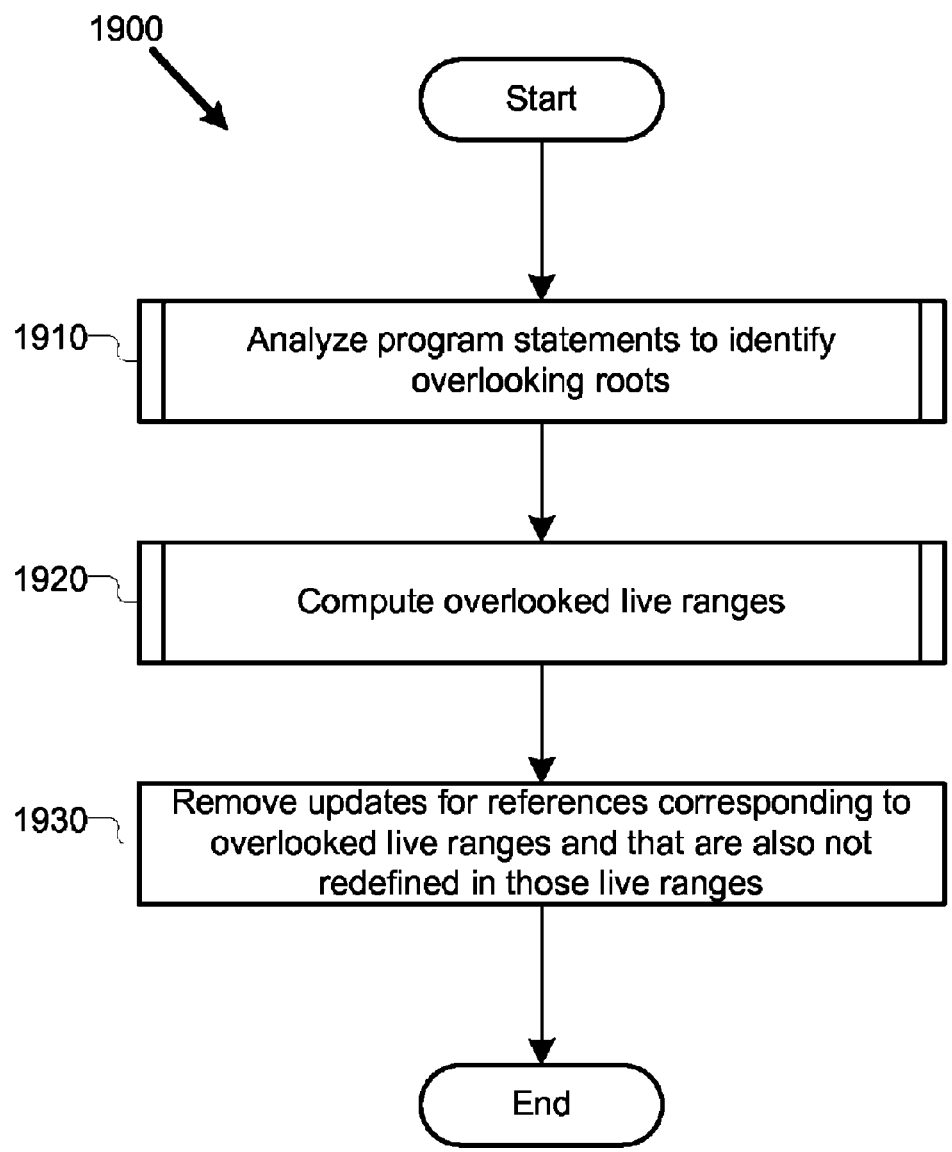
FIG. 19 is a flowchart illustrating an example process for performing an overlooking reference-counting subsumption optimization.

FIG. 19 illustrates an example process 1900 performed by the overlooking roots subsumption module 260 for determining and removing overlooking root subsumed references. In one implementation, process 1900 corresponds to block 1130 of FIG. 11. In various implementations, the illustrated process blocks may be merged, divided into subblocks, or omitted.

The process begins at block 1910, where the module 260 utilizes the overlooking roots analysis module 240 to identify overlooking root relationships in order to perform an ORCS analysis. Particular examples of this process are described above. Next, at block 1920, live ranges which correspond to roots that are overlooked, and therefore, whose updates can be removed, are computed. Examples of this process are described in greater detail below with respect to FIG. 20. Finally, at block 1930, RC updates for references which correspond to the identified live ranges, and which are not redefined in those live ranges are removed from the program. It is these updates which satisfy the ORCS provisions. The program then ends.

Figure 20:
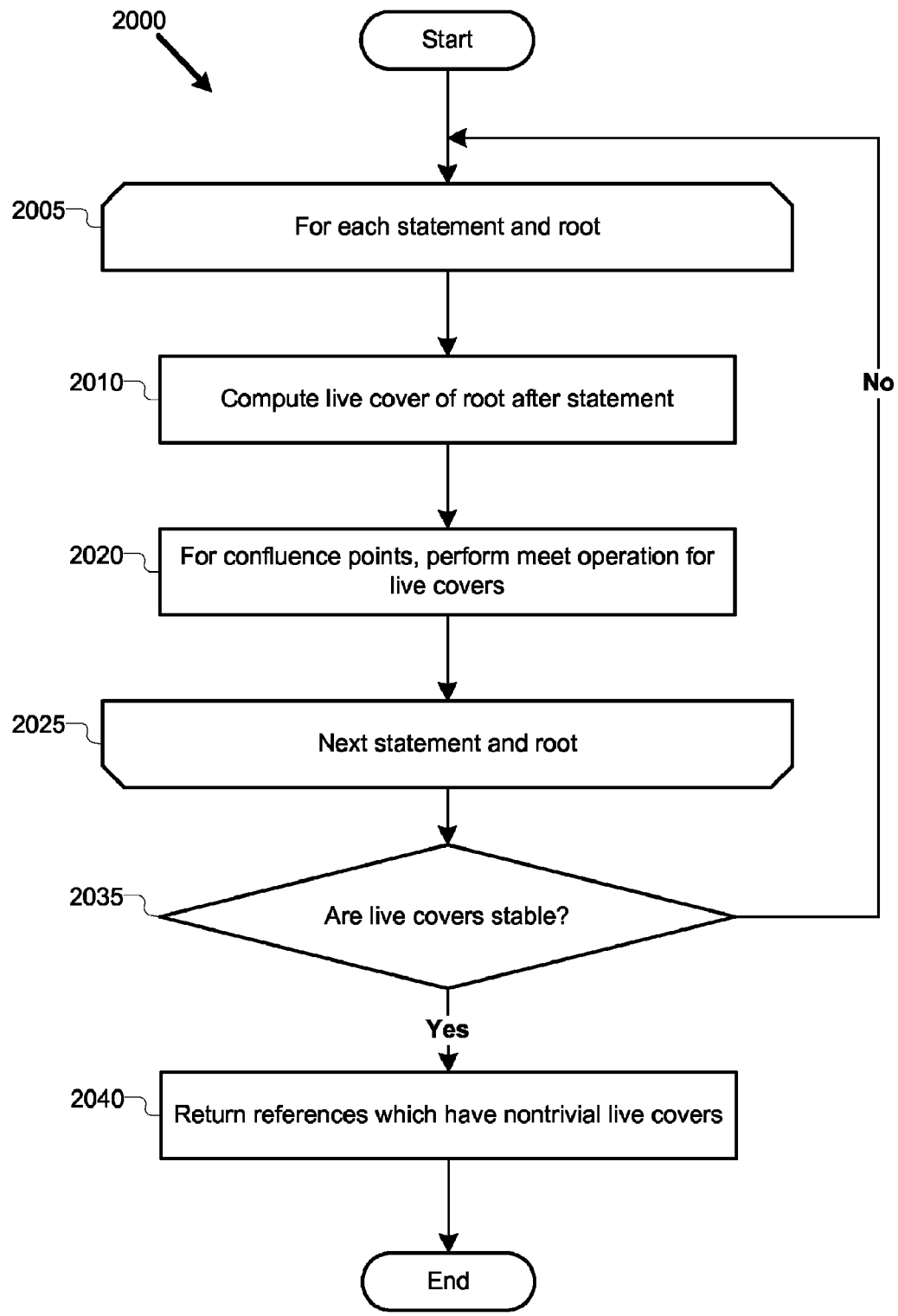
FIG. 20 is a flowchart illustrating an example process for identifying overlooked live covers as part of an overlooking reference-counting subsumption optimization.

FIG. 20 illustrates an example process 2000 performed by the overlooking roots subsumption module 260 for determining a list of live ranges that satisfy the ORCS proposition B1. In one implementation, process 2000 corresponds to block 1920 of FIG. 19. In various implementations, the illustrated process blocks may be merged, divided into subblocks, or omitted.

The process begins at block 2005 in a loop for each statement and root. Although this is illustrated as a single loop for the purposes of brevity, this may properly be thought of as two loops, one loop which loops over every statement, and then an inner loop which loops over each root in the statement. At block 2010, for the particular root and statement being iterated on, the module computes a "live cover" of the root after the statement. Block 2020 performs the meet operation on live covers at confluence points. Then, at block 2025, the loop continues for the next root and/or the next statement. After the loop is completed, at decision block 2035 the module determines if the live covers created are stable. If not, the process returns to the loop and is performed again until a fixed-point is reached. The stable live covers thus produced are used to determine the live ranges that satisfy the ORCS propositions B1 and B2 discussed above. Finally, at block 2040, the process returns a list of RC updates whose references have nontrivial live covers at the time of the update, and thus which satisfy ORCS proposition B1. RC updates for the live covers among these that also satisfy ORCS proposition B2 can be removed at block 1930. The process then ends.

The live cover of a root r at a point P is defined in one implementation as the set of live roots at least one of which overlooks r at P. Let liver(P,r) denote this set. If liver(P,r) is nonempty at all P in a live range l of r, and if provision B2 is also satisfied, then l is an ORCS live range by the definition above.

Some of the properties of live cover sets should be noted. First, every subset of a live cover is not assured to be a live cover. As an example, if liver(P,r) is $\{x_1, x_2\}$, then $\{x_1\}$ may not be a live cover of r at P. However, every superset (comprising live roots) of a nonempty live cover is a live cover. In one implementation, the former property is called the subset property, and the latter the superset property. The empty set is a special case, and is a trivial live cover.

Because of the subset property, computing liver(P,r) is not necessarily straightforward. One guaranteed live cover at P is:

$$\text{liver}'(P,r) = \text{live}(P) \cap \text{xproj}(olook(P),r) \quad (5.6)$$

where xproj is the x-projection operator described below in Section 6 with reference to updating tie functions in procedure invocations. But liver'(P,r) could be Ø, as in at confluence points. Therefore, various implementations attempt to derive better information such as ascertaining a nonempty liver(P,r) when liver'(P,r) is Ø.

If $\text{liver}_{in}(s,r)$ and $\text{liver}_{out}(s,r)$ are the live covers of r just before and just after a statement s, then, as before:

$$\text{liver}_{out}(s,r) = (\text{liver}_{in}(s,r) - \text{KILL}(s,r)) \cup \text{GEN}(s,r) \quad (5.7)$$

When figuring out the KILL(s,r) and GEN(s,r) sets, a few cases are considered. Let $s_{out}$ be the program point just after s. If liver'($s_{out}$,r) is nonempty, then by the superset property, a valid $\text{liver}_{out}$'(s,r) is $\text{liver}_{in}(s,r) \cup \text{liver}'(s_{out},r)$.

Otherwise, if s does not kill (with respect to the overlooking roots relation) any of the roots in $\text{liver}_{in}(s,r)$, and if none of these roots die as control flows through s, then $\text{liver}_{out}(s,r)$ can be set to $\text{liver}_{in}(s,r)$. Thus:

$$GEN(s, r) = \text{liver}'(s_{out}, r) \quad (5.8)$$

$$KILL(s, r) = \begin{cases} \varnothing & \text{if liver}'(s_{out}, r) \neq \varnothing \\ \check{R} & \text{else if } xproj(\text{kill}(s), r) \cap \text{liver}_{in}(s, r) \neq \varnothing \\ \check{R} & \text{else if } diethru(s) \cap \text{liver}_{in}(s, r) \neq \varnothing \\ \varnothing & \text{otherwise} \end{cases} \quad (5.9)$$

The expression kill(s) in the above is the overlooking roots' kill set, from above, and $\check{R}$ is the set of all roots. The set diethru(s) are the roots that die as control flows through s, defined in one implementation as:

$$diethru(s) = (\text{live}_{in}(s) - \text{live}_{out}(s)) \cup (\text{live}_{in}(s) \cap \text{defs}_{must}(s)) \quad (5.10)$$

where $\text{live}_{in}(s)$ are the roots that are live on entry to s, and where $\text{defs}_{must}(s)$ are the roots that must be defined in s.

As previously mentioned, after the live covers are determined, at block 2020 the module combines them. A meet operation will, at a program point Q, lying at the confluence of points $P_1$ and $P_2$, combine the live covers $\text{liver}_1$ and $\text{liver}_2$, respectively. In one implementation, the meet operation used is:

| | | |
|---|---|---|
| $\text{liver}_1 \cup \text{liver}_2$ | if $\text{liver}_1 \cup \text{liver}_2 \subseteq \text{live}(Q)$ | (5.11) |
| liver'(Q, r) | else if liver'$_1 \cap$ live(Q) $\neq$ Ø | (5.12) |
| liver'(Q, r) | else if liver'$_2 \cap$ live(Q) $\neq$ Ø | (5.13) |
| liver'$_1 \cup$ liver'$_2$ | otherwise | (5.14) | where liver'$_1$ = liver'($P_1$, r) and liver'$_2$ = liver'($P_2$, r).

5.5 Examples of Optimized RC Updates

Figure 21:
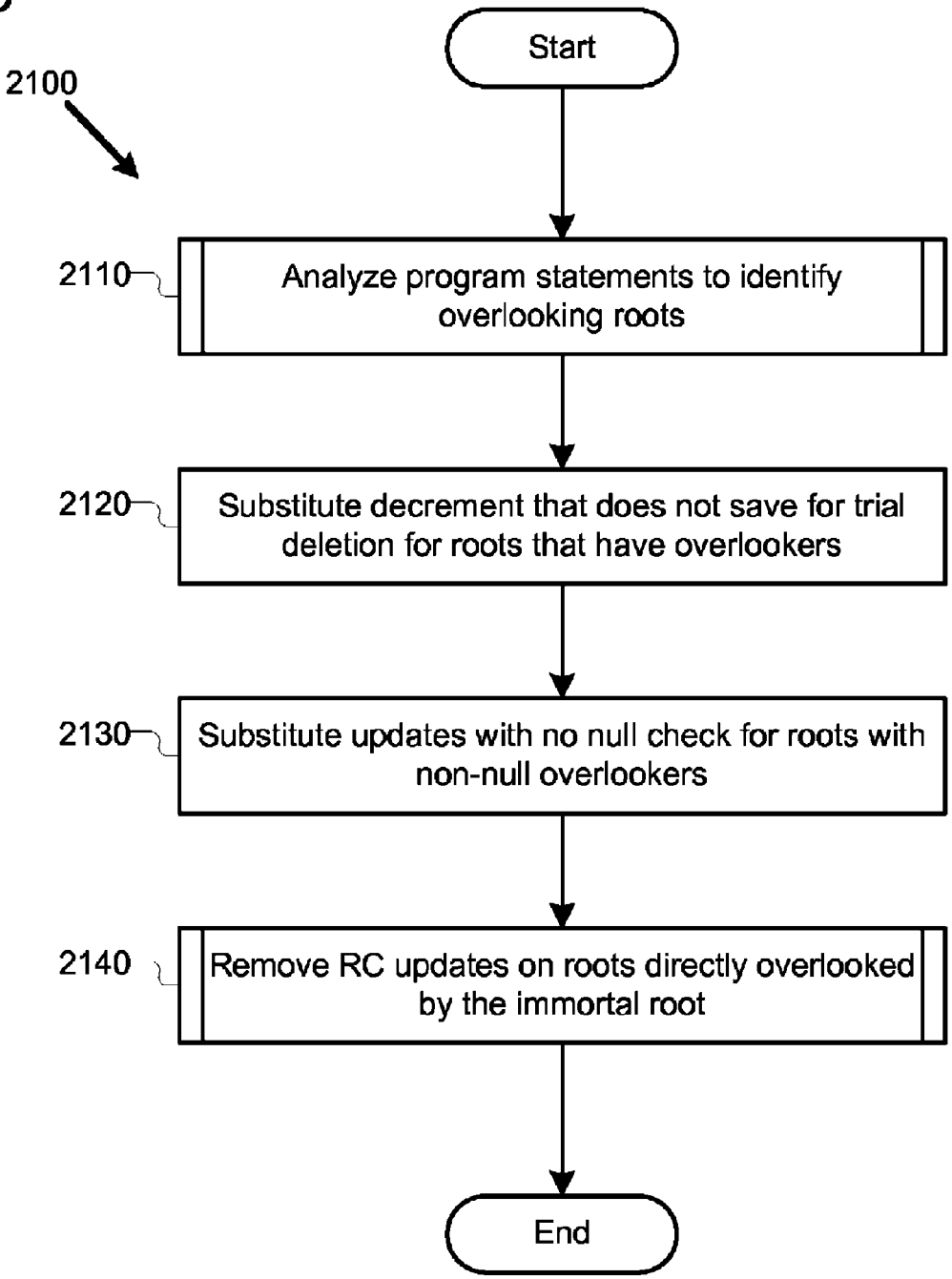
FIG. 21 is a flowchart illustrating an example process for substituting and removing reference-counting updates based on overlooking root information.

FIG. 21 illustrates an example process 2100 performed by the overlooking-root-based RC update specialization module 270 for utilizing overlooking roots information to substitute specialized RC updates for traditional RC updates. In one implementation, process 2100 corresponds to block 1140 of FIG. 11. In various implementations, the illustrated process blocks may be merged, divided into subblocks, or omitted.

The process begins at block 2110 where the module 270 obtains overlooking roots information from the overlooking roots analysis module 240 to identify overlooking roots. In one implementation, the overlooking roots information thus obtained contains particular state information about the roots which is coded in overlooking relationships, as is described below. In some implementations, the overlooking root information obtained at block 2110 was computed and stored during earlier processes (such as the overlooking roots analysis performed during the RC chaining or ORCS procedures), and is not recomputed at this point. In alternative implementations the overlooking roots information is newly-computed at this point.

5.5.1 Examples of Specializing RC Updates

Two implementations of substituting specialized RC updates are illustrated next. The first is concerned with trial deletion. Reference counting, by itself, cannot detect when a cyclic structure becomes unreachable. To get around this, a technique called trial deletion is used in various RC implementations which avoids a full heap traversal to capture garbage cycles.

Trial deletion is based on the following observation: when a reference is swung away from an object whose reference count is at least 2, that object may become unreachable, because it may represent a series of references pointing to each other in one or more cycles. Typically, such implementations stash these references away in a "potentially leaked cycles" (PLC) list, so that they can be processed later for reclaiming leaked cycles.

Overlooking roots make the following optimization possible: If a root v is overlooked by some other live root, say u, at the time v is swung away from an object b, then v does not have to be put on the PLC list. This is because b will still be reachable from u at that time. Thus, the decrement against v can be as if it pointed to an acyclic object. Hence, at block 2120, decrements that do not stash the updated reference away are substituted when the reference is known to be overlooked at the point of update.

The second implementation involves tracking interesting states of concrete roots using virtual roots. For example, a state can be tracked for a concrete root that is non-null. This is useful information because an RC update on a non-null reference can be substituted by a specialized version that elides the initial null check.

If a concrete root x is directly overlooked by a non-immortal root, then x is naturally non-null. But there may be cases where x is non-null, even though it may not be overlooked by any of the roots discussed above. An example is in the code fragment below:

1 y:=x.f
2 $RC_+(x)$
3 $RC_-(z)$
4 z:=x

At the beginning of line 2, x will be non-null, due to the exception semantics of the statement on line 1; this is independent of whether x has a non-immortal overlooker before line 1. Another example is the following code fragment:

1 x:=allocobj(T)
2 ... x ...
3 $RC_-(x)$
4 x:=null here, x will be non-null before line 3, regardless of whether any non-immortal root directly overlooks it at that point.

Thus, in one implementation, it is profitable to track a concrete root's non-null state with a separate non-null root. A statement's gen calculation would have to suitably include it in the computed olook set. In both the examples above, the calculation would add it to the overlookers of x after line 1. Hence, at block 2130, updates can be substituted which do not perform a null check for those roots that are overlooked by a non-null root.

Virtual roots could also be used to track the aliasing of local and actual references. This application assumes only four kinds of virtual roots—undefined, immortal, pristine, and actual parameter roots—to keep the exposition simple.

For the most part, virtual roots are not distinguished from concrete roots when producing and consuming overlooking root information. But distinctions are sometimes needed. For instance, in ORCS and the trial deletion buffering optimizations, the live overlooker should either be immortal, actual or concrete.

5.5.2 Examples of Utilizing Virtual Immortal and Pristine Roots

Next at block 2140, RC updates for roots directly overlooked by an immortal root are removed, in one implementation according to the following process. An object can be thought of as "immortal" if it lasts, once created, until the end of a program's execution. RC updates on these objects—examples of which include string literals and GC tables—are not needed as they live, essentially, forever. Unlike for subsumption, the RC updates do not have to be "matched" for elimination; typically, even the removal of an isolated RC update on an immortal object will not compromise program correctness, or risk a memory leak.

Past techniques presented a tailored data-flow analysis for finding sets of immortal target variables (local references to immortal objects). With overlooking roots, such a custom analysis can be included in the general overlooking roots process.

This can be done by utilizing a special virtual root which is thought to always target an immortal object. This immortal root is immutable, and "materializes" when the target immortal object is allocated. In one implementation, this is done at the very beginning of program execution, to account for statically allocated data.

Immortal roots allow RC updates on other directly overlooked roots to be removed. Let dolook(P) be defined as any set of ordered pairs that honor the directly overlooking roots relation at a point P. Under this definition, there is always an olook(P) for a given dolook(P) such that dolook(P) ⊂ olook (P). Hence, if the direct overlookers among the overlookers of a root r include an immortal root, then r must be an immortal target variable. In this way, immortal analyses can be superseded by an analysis for overlooking roots.

The use of overlooking roots in subsumption analyses make it possible to go further—they permit the detection of overlookers when roots are loaded off pristine fields. A field f can be defined as being in a "pristine" state from the moment its containing object is allocated, up to the moment it is assigned a nonzero value. For example, according to the allocation semantics of virtual execution environments like Java and .NET, the value of f in the pristine state is assured to be an appropriately casted zero. Therefore, if a reference field in the pristine state is loaded into a root y, y will be directly overlooked by an immortal root. An RC update against y can then be omitted.

This definition can be slightly generalized. Rather than up to the moment at which it is assigned a nonzero value, a reference field can be considered pristine up to the moment at which it points to an object that is not immortal.

The pristine field mechanics can be captured in the framework of overlooking roots by introducing another set of virtual roots called the pristine roots. Consider the following code fragment, which corresponds to an initialization sequence:

1 r:=allocobj(T)
2 $RC_+(x)$
3 $RC_-(r.f_1)$
4 $r.f_1:=x$
5 $RC_+(y)$
6 $RC_-(r.f_2)$
7 $r.f_2:=y$ In this fragment, a allocobj(T) returns a reference to a newly allocated, unconstructed object of type T. If T has two fields $f_1$ and $f_2$, then after line 1, r can be regarded as being directly overlooked by two pristine roots, denoted by the pairs $(r,f_1)$ and $(r,f_2)$. Note that these pairs serve, in this section, to illustrate pristine roots, not to illustrate an overlooking root relationship on their own, as in some other sections of the application. For example, the pair $(r,f_1)$ can be thought of as a single pristine root, directly overlooking r which encodes the information that field $f_1$ is pristine during the time it overlooks r.

Thus, line 3 can be optimized out because the temporary that $r.f_1$ is loaded into (during execution of the update) can be directly overlooked by an immortal root. When $r.f_1$ is overwritten on line 4, $(r,f_1)$ should be omitted or removed from the set of r's overlookers. Because $(r,f_2)$ will remain a pristine overlooker of r, this allows line 6 to be optimized out as well. While this description involves the use of virtual pristine roots at a very fine, field-level of granularity, in alternative implementations, pristine roots of a more course granularity may be used, such as using a single pristine root overlooker per target object, or even for all objects with pristine fields. Coarser formulations, however, will not encode the same degree of information as finer-grained formulations. Examples of techniques whereby immortal roots are introduced as overlookers are given below.

Figure 22:
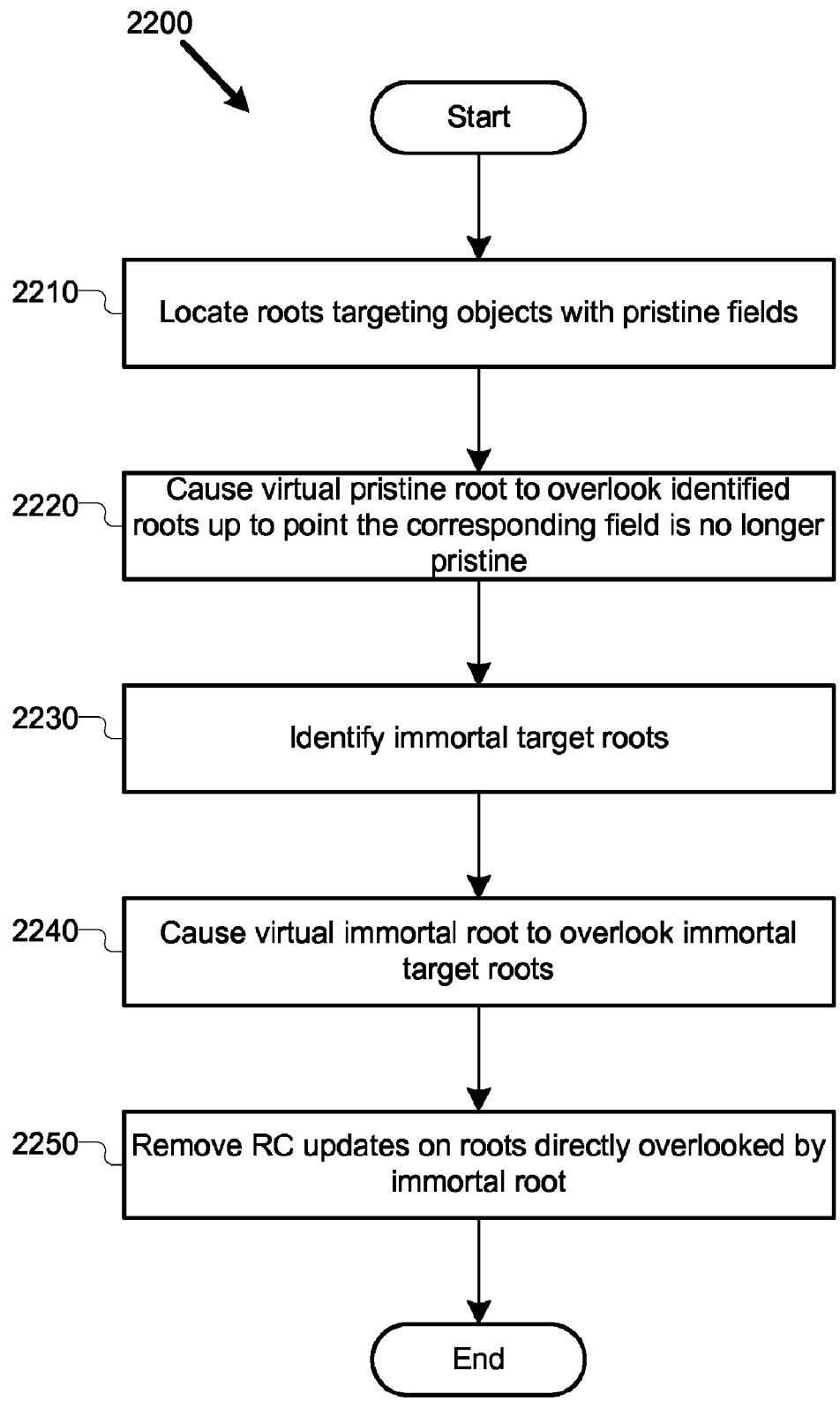
FIG. 22 is a flowchart illustrating an example process for removing reference-counting updates on roots that are directly overlooked by an immortal root.

FIG. 22 illustrates an example process 2200 performed by the RC update specialization and removal module 270 which takes advantage of these features of the overlooking and directly overlooking roots sets to include information about immortal target objects through immortal and pristine overlooking roots. In various implementations, the illustrated process blocks may be merged, divided into subblocks, or omitted. The process begins at block 2210, where roots targeting objects with pristine fields in the program are identified. As discussed above, in some implementations, these roots may be for fields defined using a definition of "pristine" which mean the fields have never been assigned a non-zero value, or the definition may be extended to include fields up to the points they are assigned to a non-immortal value.

Next, at block 2220 pristine roots are caused to overlook roots targeting objects with pristine fields identified earlier up to the point they are no longer "pristine." This may be done by automatically generating relations involving pristine roots when computing the olook sets during the overlooking root analysis for roots targeting objects with pristine fields. Thus, in one implementation the virtual pristine roots are not created in the sense that they are actually added to code in the program. Additionally, while FIG. 21 shows an overlooking roots analysis being performed before the process of FIG. 22, in one implementation, the creation of these overlooking relationships between target roots and pristine roots may be integrated into the general overlooking root analysis. It should also be noted that, while in the examples above multiple pristine roots are shown, in the examples of updating tie functions given below, a single virtual pristine root is used, and is referred to as P.

Next, at block 2230, points in the program that assign immortal objects for the first time are identified. This includes, for example, static objects, strings, and temporaries into which pristine fields are loaded, as described above. Next, at block 2240, a virtual immortal root is caused to directly overlook the roots assigned to target immortal objects at the points identified earlier. Similarly to the process for pristine roots discussed above, in one implementation, the overlooking roots analysis is modified to automatically generate relations involving immortal roots when computing the dolook sets for roots that target immortal objects. Note that, in the examples of updating tie functions given below, the virtual immortal root is referred to as I. Finally, at block 2250, RC updates for roots directly overlooked by this immortal root are removed, providing additional optimizations of the program. The process then ends.

6. Examples of Particular Tie Function Updating Procedures 6.1 Examples of Updating Tie Functions Herein follow various examples of procedures and calculations for updating tie functions, according to techniques described above. Tie functions are updated for relevant functions. In various implementations, tie functions are updated according to the category of the relevant statement. To review, assuming x, y, u and v are local or static references, relevant statements can be divided into five categories:

simple assignments: these are y:=x and y:=c, where c is a constant reference, like null or a string literal;
  allocations: this is y:=allocobj(T), where T is the type of the allocated instance;
  heap loads: these are y:=x.f and y:=x[e];
  heap stores: these are y.f:=x and y[e]:=x; and
  procedure invocations: this is y:=F( . . . ).

This section will review implementations of updating tie functions for each of these categories.

6.2 Procedure Invocations

These are statements of the form y:=F( . . . ). This statement's analysis uses a reference mutation summary $\mu(F)$ for the callee F, if one is available. The summary is transitive, i.e., the summaries of the callees are included in the caller's summary. If no summary is available, as may happen under separate compilation, all tied pairs are killed. Otherwise, only those tied by the fields or array types in $\mu(F)$ have to be killed:

$$\text{kill}(s) = \begin{cases} \{(u, v) \mid u = y \vee v = y \vee T(u, v) \neq \varnothing\} & \text{if unknown } \mu(F) \\ \{(u, v) \mid u = y \vee v = y \vee T(u, v) \cap \mu(F) \neq \varnothing\} & \text{otherwise} \end{cases} \quad (6.1)$$

The gen set is normally Ø. However, if the program call graph is available, as may happen under whole-program compilation, better gen information can be produced.

We now define the x-projection operator mentioned above. The x-projection on a root v of a set S of ordered pairs is the set of first elements in pairs of the form (u,v) in S. This is expressed as xproj(S,v). Consider a return point Q in the function F, at which a local reference r is returned. We call xproj(olook(Q),r) the return overlooker set of F at Q. Using this definition, the intersection of the return overlooker sets across all the return points of F gives the set of roots that always overlook F's returned value. Let this be called $\text{olook}_{ret}$(F).

Now consider a call statement that invokes F:
y:=F($x_1, x_2, \ldots, x_n$).

On return, I overlooks y if I∈olook$_{ret}$(F). y is also overlooked by $z_i$, ($1 \leq i \leq n$) if $\hat{z}_i$∈olook$_{ret}$(F), where $\hat{z}_i$ is the actual parameter virtual root corresponding to $\hat{z}_i$. This gives $$gen(s) = \{(I,y) | I \in olook_{ret}(F)\} \cup \{(z_i,y) | \hat{z}_i \in olook_{ret}(F)\}. \quad (6.2)$$

For Equation (6.2) to be efficacious, the analysis should be first performed on the callees of a procedure, before being performed on the procedure itself. This can be done by processing the procedures in a postorder traversal of the call graph. The olook$_{ret}$ sets for leaf procedures, and procedures at the ends of back edges in the call graph, can be set to ∅.

The extension makes it possible to derive valuable overlooking information across procedure boundaries, without resorting to a full interprocedural analysis. For instance, it can be determined that the reference returned by the function
    public IrType getType( ){return this.type;}
is always overlooked by the actual parameter, without propagating information into the function through its argument.

6.3 Simple Assignments

There are two types of simple assignment statements discussed herein. The first are statements of the form y:=x. This statement kills pairs in which the overlooker is y, and the overlookee is not x or something overlooked by x. It also kills pairs in which the overlookee is y, and the overlooker is not x or something that overlooks x. Thus, $$kill(s) = \{(y,v) | v \neq x \wedge (x,v) \notin olook_{in}(s)\} \cup \{(u,y) | u \neq x \wedge (u,x) \notin olook_{in}(s)\} \quad (6.3)$$

The statement generates two kinds of overlooking pairs: (1) those in which the overlooker is y, and the overlookee is x and whatever is overlooked by x; and (2) those in which the overlookee is y, and the overlooker is x and whatever overlooks x. This gives $$gen(s) = \{(y,v) | v \neq y \wedge (v = x \vee (x,v) \in olook_{in}^*(s))\} \cup \{(u,y) | u \neq y \wedge (u = x \vee (u,x) \in olook_{in}^*(s))\} \quad (6.4)$$

Pairs of the form (u,u) should not exist in the gen sets because of the irreflexivity of the olook sets. This is the reason for the predicates v≠y and u≠y in Equation (6.4).

As discussed above, the tie function is updated at only those pairs that are in gen*(s). From Equations (6.4) and (6.5), these are of the form (y,v) or (u,y). For the (y,v) pairs, T is updated to include the ties for (x,v). For the (u,y) pairs, it is updated to include the ties for (u,x). This leads to the update equation $$T(u,v) \overset{\cup}{\leftarrow} \begin{cases} T(x,v) & \text{if } u = y \\ T(u,x) & \text{if } v = y \end{cases} \quad (6.6)$$

applied at all (u,v)∈gen*(s). In the above equation, $$T(u,v) \overset{\cup}{\leftarrow} X$$

is a concise representation of T(u,v)←T(u,v)∪X.

The second type of statements are statements of the form y:=c, where c is a constant. Since c is a constant reference, its target can be viewed as the target of an immortal root. In various implementations, the analysis may utilize any out of a range of options on how many immortal roots to model. At one extreme, a unique immortal root may be associated with every different c. The statement can then be treated the same way as y:=x, by substituting x with the immortal root corresponding to c. At the other extreme, a single immortal root, say I, simultaneously targets all immortal objects. This implementation offers simplicity over precision. All pairs in which the overlookee is y and the overlooker is not I, or in which the overlooker is y, would then have to be killed:

$$kill(s) = \{(u,v) | (u \neq I \wedge v = y) \vee u = y\} \quad (6.7)$$

The gen set calculation for this statement should produce the pair (I,y). With a single immortal root, this will be the only pair generated; the pair (y,I) is not generated because I may target more than one object, of which some may not be reachable from y. Thus $$gen(s) = \{(I,y)\} \quad (6.8)$$

T is not updated here, because I has no overlookers.

6.4 Allocations

These are statements of the form y:=allocobj(T). Above, it was explained that the object returned by allocobj(T) can be thought to be the target of a pristine root. Like in the immortal case, various options are available on how many pristine roots to consider. There could be one per allocated type, or one per field per allocated type, or even one per allocation site. For the sake of simplicity, the implementation described herein assumes one pristine root, say P, for all allocated objects. With a single pristine root, the same issues that pertained to the calculations in Equations (6.9) and (6.10) apply to the kill and gen set calculations here:

$$kill(s) = \{(u,v) | (u \neq P \wedge v = y) \vee u = y\} \quad (6.11)$$

$$gen(s) = \{(P,y)\} \quad (6.12)$$

T is also not updated here because P has no overlookers.

6.5 Heap Loads

These are statements of the form y:=x.f If x points to a thread-local object, or if f is a thread-safe field (i.e., only accessed by a particular thread) or a read-only field, we say that the statement is multithread (MT) safe. For such statements, all pairs in which y is the overlooker, and all pairs in which the overlookee is y and the overlooker is not x or something that overlooks x, must be killed. For other statements, all pairs in which y is either the overlooker or overlookee are killed:

$$kill(s) = \quad (6.13)$$

$$\begin{cases} \{(u,v) | u = y \vee (v = y \wedge (u,x) \notin olook_{in}(s) \wedge u \neq x)\} & \text{if } MT\text{-safe } s \\ \{(u,v) | u = y \vee v = y\} & \text{otherwise} \end{cases}$$

There are a couple of cases in the gen set analysis for this statement. The easiest are the ones where s is not known to be MT-safe. In this case, depending on whether f is an immortal field, the gen set is either ∅ or has the single pair (I,y). Fields are immortal if they always target immortal objects (i.e., even when simultaneously mutated by multiple threads). An example is the vtable field that all objects possess in many object-oriented language implementations.

If s is MT-safe, then gen(s) will at least have pairs in which the overlookee is y, and the overlooker is x and whatever overlooks x. These cases yield the following equation:

$$gen(s) = \quad (6.14)$$

$$\begin{cases} \{(u,y) | u \neq y \wedge ((u,x) \in olook_{in}^*(s) \vee u = x)\} \cup \psi & \text{if } MT\text{-safe } s \\ \{(I,y)\} & \text{else if immortal } f \\ \varnothing & \text{otherwise} \end{cases}$$

In Equation (6.15), the second case occurs when f is an immortal field and s is not MT-safe. In the first case, $\psi$ is nonempty only when f is immortal, or when P directly overlooks x. If P directly overlooks x, then y can be considered to be overlooked by I, since f will then be in a pristine state. We therefore obtain the following equation for $\psi$:

$$\psi = \begin{cases} \{(I, y)\} & \text{if immortal } f, \\ \varnothing & \text{else if } (P, x) \in olook_{in}^*(s), \\ \varnothing & \text{else if } T(P, x) \neq \varnothing, \\ \{(I, y)\} & \text{otherwise.} \end{cases} \quad (6.16)$$

According to Equation (6.17), there may be two types of pairs in gen*(s). The first is (I,y). The tie function will have to be updated here only if s is MT-safe and $(I,x) \in olook_{in}^*(s)$. The second type is (u,y), where u≠I. For these pairs, either $(u,x) \in olook_{in}^*(s)$ or u=x; in both of these cases, f may tie u to y. If u≠x, then whatever ties u to x may also tie u to y. This leads to the following update of the tie function, performed at all (u,v)∈gen*(s):

$$T(u, v) \overset{\cup}{\leftarrow} \begin{cases} \varnothing & \text{if not } MT\text{-safe } s, \\ \{f\} & \text{else if } u = x, \\ T(u, x) \cup \{f\} & \text{otherwise} \end{cases} \quad (6.18)$$

The treatment of y:=x[e] is similar, except that instead of a tie field, the discussion involves a tie array type.

6.6 Heap Stores

These are statements of the form y.f:=x. We say that the statement is MT-safe if y points to a thread-local object, or if f is a read-only or thread-safe field. Note that it is not necessarily contradictory for f to be read-only despite this being an update of f; this will be the case if the update is in an object construction sequence. Then all accesses to f in the sequence will still be thread safe because the object being constructed will only be accessible to the initializing thread.

Irrespective of whether it is MT-safe, it will kill all overlooking pairs involving the pristine root, if the number of pristine roots is one, and if x is not directly overlooked by the immortal root. This is because the update could then destroy the pristine state of any newly allocated object.

At first glance, it would appear that all pairs in $olook_{in}(s)$ that are tied by f would have to be killed. But the statement has two important properties, from the standpoint of the overlooking roots relation, which permit better kill information. First it can be proven that the following relation is true: Let s be the statement y.f:=x, which is given to be MT-safe. If m overlooks x just before s, and if m is not the pristine root, then m will also overlook x just after s.

Second the following can also be proven: Let s be the statement y.f:=x, given to be not necessarily MT-safe. If n overlooks y just before s, and if n is not the pristine root, then n will also overlook y just after s. This relation, unlike the first, does not impose MT-safe requirements on s. This is because if n overlooks y just before s, then during the execution of s, there will always be a path by which n overlooks y and that is free of the specific instance of f updated by s. Hence, from the two relations above and the discussion on killing pairs that involve the pristine root, we can generate:

$$\text{kill}(s) = \kappa \cup \{(P, v) \mid (I, x) \notin olook_{in}(s) \vee T(I, x) \neq \varnothing\}, \quad (6.19)$$

where $$\kappa = \begin{cases} \{(u, v) \mid v \neq x \wedge v \neq y \wedge u \neq P \wedge f \in T(u, v)\} & \text{if } MT\text{-safe } s, \\ \{(u, v) \mid v \neq y \wedge u \neq P \wedge f \in T(u, v)\} & \text{otherwise.} \end{cases} \quad (6.20)$$

In Equation (6.21), the predicate $(I,x) \notin olook_{in}(s) \vee T(I,x) \neq \varnothing$ is true if I might not directly overlook x. The equation then includes all pairs in which P is the overlooker.

If s is MT-safe, then all of the overlookers of y, including y, will end up overlooking x as well as whatever is overlooked by x. If s is not MT-safe, but if f is known to be an immortal field, then x will be directly overlooked by I. This is subtle, because even if another thread mutates f as s is executed, its target, by definition, remains immortal. Neither y nor x, however, end up overlooking I because I could target multiple objects. This gives $$\text{gen}(s) = \quad (6.22)$$

$$\begin{cases} \{(u, v) \mid (u = y \vee (u, y) \in olook_{in}^*(s)) \wedge ((x, v) \in olook_{in}^*(s) \vee v = x)\} \\ \bigcup \xi & \text{if } MT\text{-safe } s \\ \{(I, x)\} & \text{else if immortal } f \\ \varnothing & \text{otherwise} \end{cases}$$

$\xi$ in Equation (6.23) is similar to $\psi$ in Equation (6.24). It is usually $\varnothing$, except when f is immortal:

$$\psi = \begin{cases} \{(I, x)\} & \text{if immortal } f, \\ \varnothing & \text{otherwise,} \end{cases} \quad (6.25)$$

From Equation (23), a pair in gen*(s) can be of three forms. If it is (y,x), then only f needs to be added to T(y,x). If it is of the form (y,v), where v≠x, then {f} and T(x,v) would have to be added to T(y,v). Pairs in gen*(s) that do not match (y,v) will be of the form (u,v), where either $(u,y) \in olook_{in}^*(s)$ or u=I. In both cases, a safe update of T(u,v) is to add T(u,y), {f} and T(x,v) to it. By observing that both T(x,x) and T(y,y) equal $\varnothing$, all of these cases can be combined into:

$$T(u, v) \overset{\cup}{\leftarrow} \begin{cases} \varnothing & \text{if not } MT\text{-safe } s, \\ T(u, x) \cup \{f\} \cup T(x, v) & \text{otherwise} \end{cases} \quad (6.26)$$

where (u,v)∈gen*(s). The statement y[e]:=x is handled the same way.

6.7 Examples of Meet Operators

The meet operation for overlooking root analysis is set intersection, except that overlooking pairs containing the T root are specially dealt with. T can only occur in pairs of the form (T,u). This is because when there are no upward-exposed uses of a concrete root x, x will not overlook any other root until defined. Its only overlooker until its definition will be T, after which it will no longer be overlooked by T. Thus, if $olook_1$ and $olook_2$ are two olook sets that reach a confluence point, their meet $olook_2 \barwedge olook_2$ at that point can be given by:

$$olook_1 \mathbin{\tilde{\cap}} olook_2 = \{(u, v) \mid ((T, v) \in olook_1 \wedge (u, v) \in olook_2) \quad (6.27)$$
$$\vee ((u, v) \in olook_1 \wedge (T, v) \in olook_2)$$
$$\vee ((u, v) \in olook_1 \wedge (u, v) \in olook_2)\}.$$

Let $\check{R}$ be the set of all roots. Because $\tilde{\cap}$ is an idempotent, commutative and associative operator on the set of ordered pairs, $\check{R} \times \check{R}$, the pair $(\check{R} \times \check{R}, \tilde{\cap})$ defines a semilattice. The semilattice, the $\tilde{\cap}$ operator, and the transfer functions in Section 4.2, form a monotone data-flow analysis framework.

7. Computing Environment

The above reference-counting insertion and overlooking-root-based optimization techniques can be performed on any of a variety of computing devices. The techniques can be implemented in hardware circuitry, as well as in software executing within a computer or other computing environment, such as shown in FIG. 23.

Figure 23:
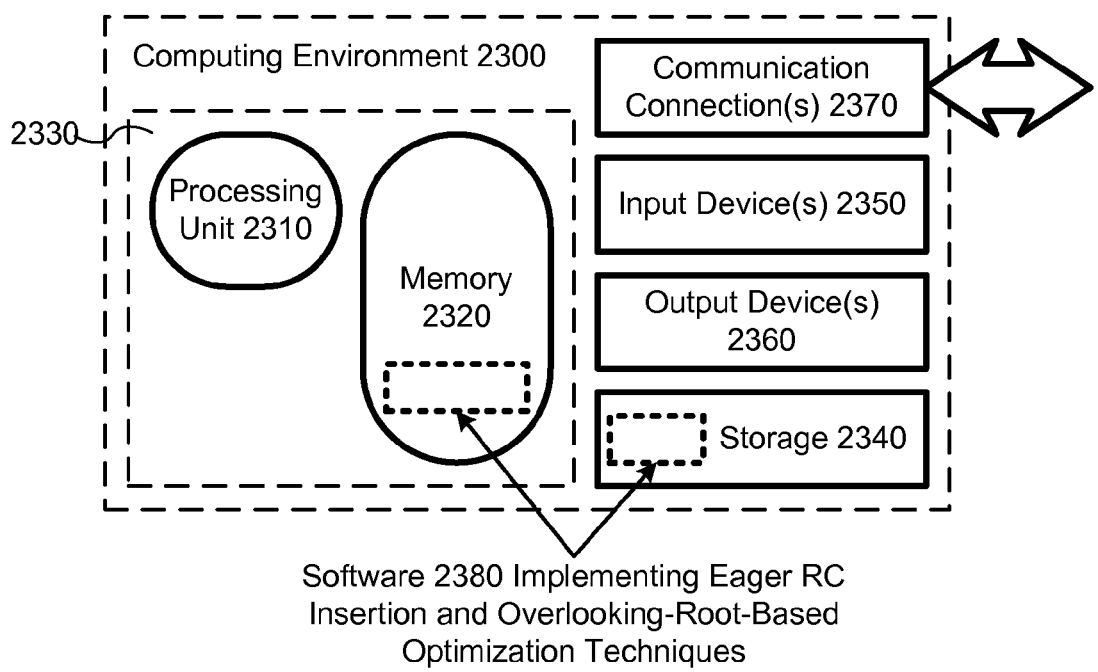
FIG. 23 is a block diagram of a suitable computing environment for implementing the techniques herein.

FIG. 23 illustrates a generalized example of a suitable computing environment (2300) in which described embodiments may be implemented. The computing environment (2300) is not intended to suggest any limitation as to the scope of use or functionality of the invention, since the present invention may be implemented in diverse general-purpose or special-purpose computing environments.

With reference to FIG. 23, the computing environment (2300) includes at least one processing unit (2310) and memory (2320). In FIG. 23, this most basic configuration (2330) is included within a dashed line. The processing unit (2310) executes computer-executable instructions and may be a real or a virtual processor. In a multiprocessing system, multiple processing units execute computer-executable instructions to increase processing power. The memory (2320) may be volatile memory (e.g., registers, cache, RAM), non-volatile memory (e.g., ROM, EEPROM, flash memory, etc.), or some combination of the two. The memory (2320) stores software (2380) implementing the described techniques.

A computing environment may have additional features. For example, the computing environment (2300) includes storage (2340), one or more input devices (2350), one or more output devices (2360), and one or more communication connections (2370). An interconnection mechanism (not shown) such as a bus, controller, or network, interconnects the components of the computing environment (2300). Typically, operating system software (not shown) provides an operating environment for other software executing in the computing environment (2300), and coordinates activities of the components of the computing environment (2300).

The storage (2340) may be removable or non-removable, and includes magnetic disks, magnetic tapes or cassettes, CD-ROMs, CD-RWs, DVDs, or any other medium which can be used to store information and which can be accessed within the computing environment (2300). The storage (2340) stores instructions for the software (2380) implementing the described techniques.

The input device(s) (2350) may be a touch input device such as a keyboard, mouse, pen, or trackball, a voice input device, a scanning device, or another device that provides input to the computing environment (2300). For audio, the input device(s) (2350) may be a sound card or similar device that accepts audio input in analog or digital form, or a CD-ROM reader that provides audio samples to the computing environment. The output device(s) (2360) may be a display, printer, speaker, CD writer, or another device that provides output from the computing environment (2300).

The communication connection(s) (2370) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment (2300), computer-readable media include memory (2320), storage (2340), communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc., which perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "interpolate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

I claim:

1. A method for modifying a program to employ reference-counting garbage collection, the method comprising:
   generating one or more sets of overlooking roots for one or more respective points in the program, wherein generating one or more sets of overlooking roots comprises (a) and (b):
   (a) computing tie functions for procedures in the program, a tie function is a function which, for two roots, gives a set of fields and array types that tie the roots together; and
   (b) updating the tie functions, the updating comprising including additional fields or array types that tie the two roots together, the tie functions being updated for relevant statements in the program based on a categorization of the relevant statements, at least one of the relevant statement being categorized into at least one of the following categories: allocations and heap stores; and
   introducing reference-counting updates into the program based at least in part using the one or more sets of overlooking roots;
   wherein generating one or more sets of overlooking roots comprises performing the fixed-point computation to arrive at a stable set of overlooking roots; and wherein performing the fixed-point computation comprises (i)-(v):
(i) computing a killed overlooking roots set consulting an incoming overlooking roots set and a tie function;
(ii) computing a generated overlooking roots set from a modified version of the incoming overlooking roots set;
(iii) weakly updating the tie function for a procedure;
(iv) computing a meet operation at confluence points; and
(v) repeating (i)-(iv) until a stable set of overlooking roots is calculated.

2. The method of claim 1, wherein introducing reference-counting updates comprises determining overlooking reference-counting subsumption live ranges at least in part based on the one or more sets of overlooking roots.

3. The method of claim 1, wherein a field ties a first root to a second root if, for a point in a procedure, the field occurs in every heap path by which the first root overlooks the second root at that point.

4. The method of claim 1, wherein an array type ties a first root to a second root if, for a point in a procedure, an instance of the array type occurs in every heap path by which the first root overlooks the second root at that point.

5. The method of claim 1, wherein weakly updating the tie function comprises computing the killed and generated overlooking roots sets differently for different categories of statements.

6. The method of claim 1, wherein the tie function is only updated for relevant statements.

7. The method of claim 1, wherein multiple implementations of a tie function are utilized.

8. The method of claim 1, further comprising generating one or more sets of directly overlooking roots by calculating pairs of roots which are overlooking immediately before a statement and whose output from the tie function is null.

9. One or more computer-readable storage media comprising a computer-executable system that utilizes reference-counting garbage collection from source code, the system comprising:
a first compiler module configured to represent the source code as an intermediate representation;
an overlooking roots analysis module configured to analyze program statements in the intermediate representation using tie functions to determine sets of overlooking roots for roots in the program statements, a tie function is a function which, for two roots, gives a set of plural fields and plural array types that tie the roots together, the tie functions being updated to include additional fields or array types that tie the two roots together, the tie functions being updated for relevant statements based on a categorization of the relevant statements, wherein at least one of the relevant statements is categorized as an allocation, at least one of the relevant statements is categorized as a heap store, and at least one of the relevant statements is categorized as a procedure invocation;
a live range analysis module configured to determine live ranges based on the sets of overlooking roots; and
an overlooking root RC subsumption optimization module configured to optimize redundant reference-counting updates based at least in part on the determined live ranges;
wherein the overlooking roots analysis module is further configured to, for one or more statements in the program;
compute a set of overlooking roots for the statement using a tie function for a procedure the statement is in;
update a tie function; and
repeat the computing and updating until the module arrives at a stable set of overlooking roots.

10. The system of claim 9, wherein the overlooking roots analysis module is configured to weakly update the tie function.

11. The system of claim 9, wherein the tie function reports, for two roots, which fields or array types could break an overlooking relationship between the roots.

12. The system of claim 9, wherein the overlooking RC subsumption analysis module is configured to determine overlooking reference-counting subsumption live ranges by determining, for a live range for a local reference:
if the reference is overlooked by a live root at every point in the live range; and
if the reference is not redefined in the live range.

13. One or more computer-readable storage media comprising computer-executable instructions for performing a method for creating a computer-executable program that employs reference-counting garbage collection, the method comprising:
creating a control-flow graph for an input program;
analyzing the control-flow graph using tie functions to determine overlooking root reference-counting subsumption live ranges, a tie function is a function which, for two roots, gives a set of plural fields and plural array types that tie the two roots together, the tie functions being updated for relevant statements in the input program according to categories of the relevant statements, the categories comprising simple assignments, allocations, heap loads, heap stores, and procedure invocations, wherein the tie functions being updated comprises including additional fields or array types that tie the two roots together; and
inserting reference-counting update commands for reference updates outside of the determined live ranges;
wherein determining overlooking root reference-counting subsumption live ranges comprises performing the fixed-point computation to arrive at a stable set of overlooking roots; and wherein, for a program statement, performing the fixed-point computation comprises repeating (i)-(iv) below until a stable set of overlooking roots is calculated:
(i) computing a killed overlooking roots set consulting an incoming overlooking roots set and a tie function;
(ii) computing a generated overlooking roots set from a modified version of the incoming overlooking roots set;
(iii) weakly updating the tie function for a procedure; and
(iv) computing a meet operation at confluence points.

14. The computer-readable storage media of claim 13, wherein analyzing the control-flow graph using tie functions comprises:
for each of one or more program points, iterating through an analysis which successively expands an overlooking roots set until the overlooking roots set is stable.

15. The computer-readable storage media of claim 14, wherein analyzing the control-flow graph using tie functions further comprises:
determining, for a given local reference, one or more live ranges for the local reference for which the local reference is not redefined and for which there is an overlooking live root at every point in the live range.

16. One or more computer-readable storage media comprising computer-executable instructions for performing a method for modifying a program to employ reference-counting garbage collection, the method comprising:

generating one or more sets of overlooking roots for one or more points in the program, wherein generating one or more sets of overlooking roots comprises (a) and (b):

(a) computing tie functions for procedures in the program, a tie function is a function which, for two roots, gives a set of fields and array types that tie the two roots together; and (b) updating the tie functions to include new fields or array types that tie the two roots together, the tie functions being updated for relevant statements in the program based on a categorization of the relevant statements, the relevant statements being categorized into at least one of the following five categories: simple assignments, allocations, heap loads, and procedure invocations, such that at least one of the relevant statements is categorized into each of the five categories; and introducing reference-counting updates into the program based at least in part using the one or more sets of overlooking roots;

wherein generating one or more sets of overlooking roots comprises performing a fixed-point computation to arrive at a stable set of overlooking roots and wherein, for a program statement, performing the fixed-point computation comprises (i)-(v):

(i) computing a killed overlooking roots set consulting an incoming overlooking roots set and a tie function;

(ii) computing a generated overlooking roots set from a modified version of the incoming overlooking roots set;

(iii) weakly updating the tie function for a procedure;

(iv) computing a meet operation at confluence points; and (v) repeating the above steps until a stable set of overlooking roots is calculated.

* * * * *